(12) United States Patent
Adenwala et al.

(10) Patent No.: US 11,704,007 B2
(45) Date of Patent: Jul. 18, 2023

(54) COMPUTER-ASSISTED OR AUTONOMOUS DRIVING VEHICLES SOCIAL NETWORK

(71) Applicant: Intel Corporation, Santa Clara, CA (US)

(72) Inventors: Fatema Adenwala, Hillsboro, OR (US); Ankitha Chandran, Portland, OR (US); Nageen Himayat, Fremont, CA (US); Florence Pon, Folsom, CA (US); Divya Vijayaraghavan, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/315,672

(22) Filed: May 10, 2021

(65) Prior Publication Data

US 2021/0303137 A1   Sep. 30, 2021

Related U.S. Application Data

(63) Continuation of application No. 16/141,219, filed on Sep. 25, 2018, now Pat. No. 11,036,370.

(51) Int. Cl.
  *H04W 4/46* (2018.01)
  *H04W 4/44* (2018.01)
  (Continued)

(52) U.S. Cl.
  CPC ........ *G06F 3/04842* (2013.01); *G06F 3/0481* (2013.01); *G07C 5/008* (2013.01);
  (Continued)

(58) Field of Classification Search
  CPC .... G06F 3/04842; G06F 3/0481; H04W 4/46; H04W 4/44; H04W 4/21; H04W 4/026;
  (Continued)

(56) References Cited

U.S. PATENT DOCUMENTS

| 9,940,840 B1 * | 4/2018 | Schubert | ............ G01C 21/3407 |
| 2007/0162550 A1 * | 7/2007 | Rosenberg | .............. H04L 51/04 |
| | | | 709/206 |

(Continued)

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 27 pages, Jun. 2018, 3GPP. TS.37.320, v15.0.

(Continued)

*Primary Examiner* — Beau D Spratt
(74) *Attorney, Agent, or Firm* — Schwabe, Williamson & Wyatt, P.C.

(57) ABSTRACT

Apparatuses, methods and storage medium associated with computer-assisted or autonomous driving (CA/AD) vehicles are disclosed herein. In embodiments, CA/AD vehicles are members of a CA/AD vehicle social network (CASN) in which various CA/AD vehicles may form connections or relationships with one another. CA/AD vehicles that have an existing relationship or connection may share CASN information with one another. The CASN information may include authenticated and/or proprietary information. Other embodiments are also described and claimed.

29 Claims, 13 Drawing Sheets

(51) Int. Cl.

| | |
|---|---|
| *G06F 3/04842* | (2022.01) |
| *G07C 5/00* | (2006.01) |
| *H04W 4/21* | (2018.01) |
| *G06F 3/0481* | (2022.01) |
| *H04W 4/02* | (2018.01) |
| *G05D 1/00* | (2006.01) |
| *G05D 1/02* | (2020.01) |

(52) U.S. Cl.
CPC ............. *H04W 4/026* (2013.01); *H04W 4/21* (2018.02); *H04W 4/44* (2018.02); *H04W 4/46* (2018.02); *G05D 1/0088* (2013.01); *G05D 1/0287* (2013.01); *G05D 2201/0213* (2013.01)

(58) Field of Classification Search
CPC .... G07C 5/008; G05D 1/0088; G05D 1/0287; G05D 2201/0213
See application file for complete search history.

(56) References Cited

U.S. PATENT DOCUMENTS

| | | | |
|---|---|---|---|
| 2010/0256836 | A1 | 10/2010 | Mudalige |
| 2012/0110096 | A1 | 5/2012 | Smarr et al. |
| 2013/0086164 | A1 | 4/2013 | Wheeler et al. |
| 2014/0214933 | A1 | 7/2014 | Liu et al. |
| 2016/0035152 | A1 | 2/2016 | Kargupta |
| 2017/0127249 | A1* | 5/2017 | Li .......................... H04L 51/214 |
| 2017/0174221 | A1 | 6/2017 | Vaughn et al. |
| 2018/0141568 | A1 | 5/2018 | Singhal et al. |
| 2018/0143649 | A1* | 5/2018 | Miao ..................... B60W 60/00 |
| 2018/0203451 | A1 | 7/2018 | Cronin et al. |
| 2018/0259956 | A1 | 9/2018 | Kawamoto |
| 2019/0003848 | A1* | 1/2019 | Hoten ................ G01C 21/3644 |
| 2019/0206260 | A1 | 7/2019 | Pilkington et al. |
| 2019/0272760 | A1* | 9/2019 | McQuillen ............. G08G 1/163 |

OTHER PUBLICATIONS

Louise A. Dennis et al., "Declarative Abstractions for Agent Based Hybrid Control Systems", 2011, 16 pages.

Pedro Fernandes et al., "Platooning of autonomous vehicles with intervehicle communications in SUMO traffic simulator", 7 pages, Oct. 2010.

Irshad Ahmed Abbasi et al., "A Review of Vehicle to Vehicle Communication Protocols for VANETs in the Urban Environment", Jan. 31, 2018, 15 pages.

"Intel 5G-modem fact sheet: Delivering Gigabit Speeds and Ultra-Low Latency, the Intel® 5G Modem Will Help Revolutionize Autonomous Driving, Wireless Broadband and More", Jan. 4, 2017, 2 pages.

"Intel® GO™ Automated Driving Solutions Automated driving, accelerated", 2017, 6 pages.

Maryam Kamali et al., "Formal verification of autonomous vehicle platooning", 2017, 19 pages, Science Computer Programming 148, http://www.elsevier.com/locate/scico.

Jayshree Dayanand Mallapur et al., "Vehicular Traffic Management Using Cloud Network App", 2017, 7 pages, International Journal of Science, Technology and Society, vol. 5, No. 6.

Victor Olugbemiga Matthews et al., "Smart Vehicular Traffic Management System using RFID Technology", Jul. 2017, 5 pages.

"Redpine Signals—WaveCombo Solutions", 2016, 2 pages, www.redpinesignals.com.

"Redpine Signals—WaveCombo™ Module Product Brief", 2016, 2 pages, www.redpinesignals.com.

M. Rose et al., "Structure and Identification of Management Information for TCP/IP-based Internets", May 1990, 22 pages; RFC1155.

J. Case et al., A Simple Network Management Protocol (SNMP), May 1990, 36 pages, RFC1157.

K. McCloghrie et al., "Management Information Base for Network Management of TCP/IP-based internets: MIB-II", Mar. 1991, RFC1213.

F. Kastenholz, "The Definitions of Managed Objects for the IP Network Control Protocol of the Point-to-Point Protocol", Jun. 1993, 10 pages, RFC1473.

K. McCloghrie et al., "Structure of Management Information Version 2 (SMIv2)", Apr. 1999,43 pages, RFC2578.

R. Raghunarayan, Ed. "Management Information Base for the Transmission Control Protocol (TCP)", Mar. 2005, 24 pages, RFC4022.

S. Routhier, Ed., "Management Information Base for the Internet Protocol (IP)", Apr. 2006, 122 pages, RFC4293.

"SAE International—Surface Vehicle Recommended Practice—J3016", Jun. 2018, 35 pages.

Office Action dated Sep. 25, 2018 for U.S. Appl. No. 16/141,219, 27 pages.

Final Office Action dated Jun. 2, 2020 for U.S. Appl. No. 16/141,219, 25 pages.

Office Action dated Sep. 15, 2020 for U.S. Appl. No. 16/141,219, 23 pages.

* cited by examiner

COMPUTER-ASSISTED OR AUTONOMOUS DRIVING VEHICLES SOCIAL NETWORK

CROSS REFERENCE TO RELATED APPLICATIONS

The present application is a continuation of U.S. application Ser. No. 16/141,219 filed Sep. 25, 2018 entitled "COMPUTER-ASSISTED OR AUTONOMOUS DRIVING VEHICLES SOCIAL NETWORK", the contents of which is hereby incorporated by reference in its entirety.

TECHNICAL FIELD

The present disclosure relates to the field of computer-assisted or autonomous driving (CA/AD). More particularly, the present disclosure relates to systems and methods for social networking among CA/AD vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), or other like self-learning systems to enable autonomous operation. Typically, these systems perceive their environment (e.g., using sensor data) and perform various actions to maximize the likelihood of successful vehicle operation. The information learnt and saved by these systems is usually proprietary and belongs to the AI/ML developer/owner. Currently, there are no mechanisms for these AI/ML systems to exchange information to enable better vehicle operations experiences. Also, there are currently no mechanisms that provide CA/AD owners to control the dissemination of the proprietary AI/ML information.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
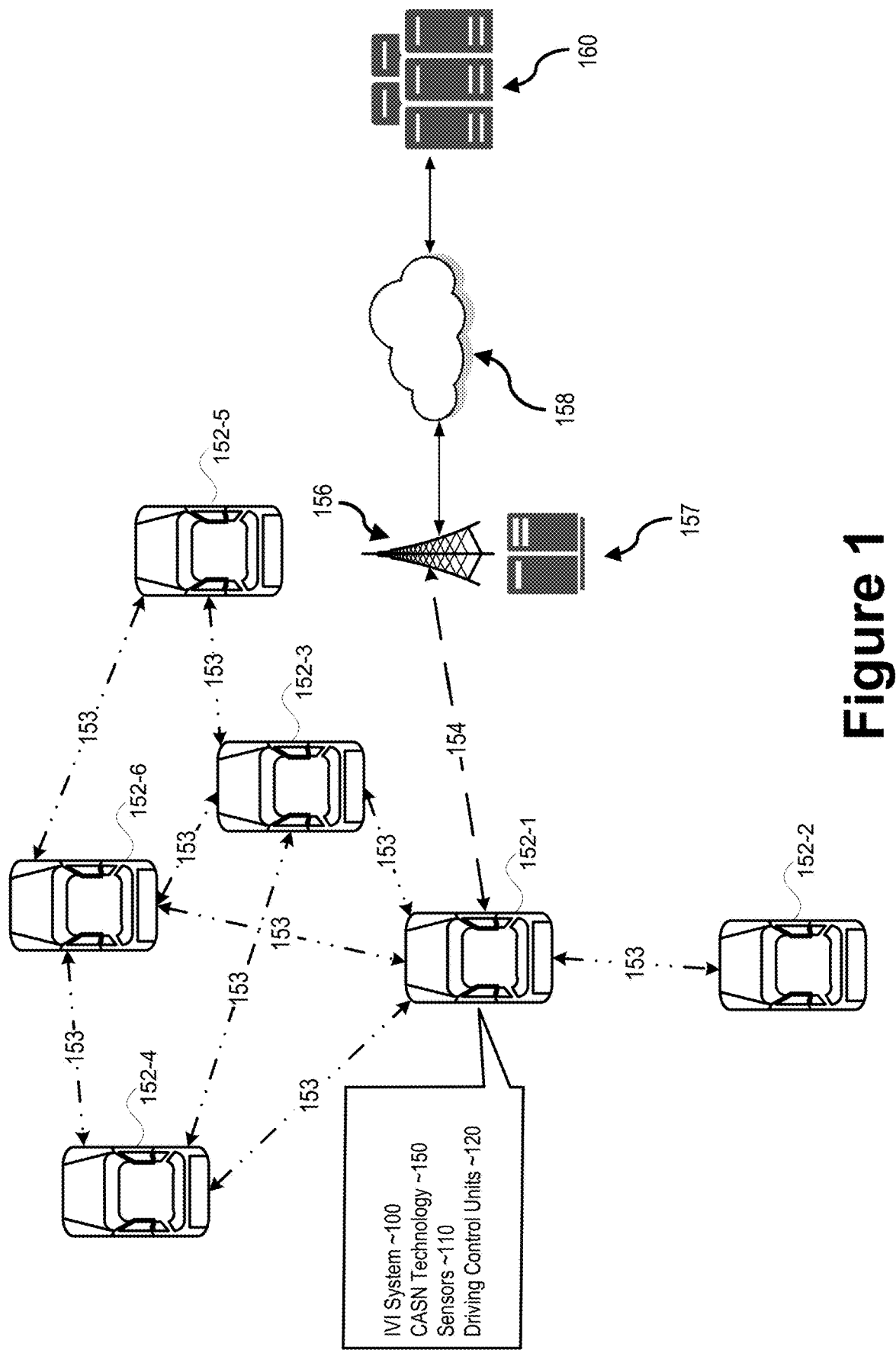
FIG. 1 illustrates an overview of an environment for incorporating and using the computer-assisted or Autonomous driving Social Networking (CASN) technology of the present disclosure.

To address challenges discussed in the background section, apparatuses, methods and storage medium associated with sharing information among computer-assisted or autonomous driving vehicle, are disclosed herein. Embodiments discussed herein are related to social networking among computer-assisted or autonomous driving (CA/AD) vehicles. In embodiments, a CA/AD Social Network (CASN) is a platform that allows CA/AD vehicles to share authenticated and/or proprietary information. Relationships between CA/AD vehicles are established with other CA/AD vehicles by invitation, which provides a gated-access approach to enable trust among CA/AD vehicles. Each CA/AD vehicle in the CASN has a group of 'connections' with whom CA/AD profile information is shared based on user privacy settings and/or other criteria. The CA/AD vehicles in a group can share social travelling experiences in a manner that is similar to typical social networking or microblogging platforms. In addition, the CASN can be used to share proprietary artificial intelligent (AI) or machine learning (ML) information, information about infrastructure limitations of certain geographic areas, provide dynamic traffic management, and establish/maintain dynamic platoons.

Each CA/AD vehicle in the CASN generates an CASN profile that includes user information and CA/AD vehicle generated data (e.g., equipment information, vehicle metrics, AI driving performance statistics, CA/AD vehicle capabilities, etc.). The CASN profiles are different than typical social network profiles in that each CASN profile is tied to a hardware fingerprint of the underlying CA/AD vehicle. Furthermore, the CASN may be used to establish fog or edge computing environments on an ad-hoc basis to conserve networking resources of mobile network operators, and to conserve storage resources of cloud computing services or the like.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Referring now to FIG. 1, wherein an overview of an environment for incorporating and using the CASN technology of the present disclosure, in accordance with various embodiments, is illustrated. As shown, for the illustrated embodiments, example environment 50 includes a plurality of CA/AD vehicles 152 (labeled 152-1 through 152-6 in FIG. 1). For illustrative purposes, the following description is provided for deployment scenarios including CA/AD vehicles 152 in a two dimensional (2D) freeway/highway/roadway environment wherein the CA/AD vehicles 152 are automobiles. However, the embodiments described herein are also applicable to other types of vehicles, such as trucks, busses, motorboats, motorcycles, electric personal transporters, and/or any other motorized devices capable of transporting people or goods. Also, embodiments described herein are applicable to social networking between vehicles of different vehicle types. The embodiments described herein may also be applicable to three dimensional (3D) deployment scenarios where some or all of the vehicles 152 are implemented as flying objects, such as aircraft, drones, unmanned aerial vehicles (UAVs), and/or to any other like motorized devices.

The CA/AD vehicles 152 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of CA/AD vehicles 152 shown by FIG. 1 may represent motor vehicles of varying makes, models, trim, etc., and may be collectively referred to as a "CA/AD vehicle 152" or the like.

Each CA/AD vehicle 152 includes an in-vehicle infotainment (IVI) system 100, one or more sensors 110, and one or more driving control units (DCUs) 120. The IVI system 100 includes a number of infotainment subsystems or applications, such as instrument cluster subsystem/applications, front-seat infotainment subsystem/application, a navigation subsystem/application, a media subsystem/application, a vehicle status subsystem/application and so forth, and a number of rear seat entertainment subsystems/applications. The DCUs 120/121 include hardware elements that control various systems of the CA/AD vehicles 152, such as the operation of the engine, the transmission, steering, braking, etc. The sensors 110 are configured to provide various sensor data to the DCUs 120 and/or one or more AI agents to enable the DCUs 120 and/or one or more AI agents to control respective control systems of the vehicles 152. Further, each CA/AD vehicle 152 is provided with CA/AD Social Network (CASN) system/technology 150 of the present disclosure, which allows the CA/AD vehicles 152 to share authenticated and/or proprietary information with one another, and to perform other like social networking functions. In some embodiments, the CASN technology 150 is a subsystem of the IVI system 100. Various aspects of the CASN technology 150 will be further described infra.

The CASN technology 150 allows the CA/AD vehicles 152 to form connections or relationships 153 with one another by invitation. The invitation-based connection/relationship 153 establishment provides a gated-access approach to establishing trust among CA/AD vehicles 152 and/or users of the CA/AD vehicles 152. Each CA/AD vehicle 152 in the CASN has a group of connections/relationships 153 with whom CASN profile information is shared based on, for example, owner/operator privacy settings or other like parameters. In the example of FIG. 1, the connection/relationship 153 may also represent individual communication links or channels over which the CA/AD vehicles 152 may communicate.

As an example, the CA/AD vehicle 152-1 in FIG. 1 uses the CASN technology 150 to generate a CASN profile comprising authenticated and/or proprietary information that is uniquely tied to the configuration of CA/AD vehicle 152-1. The CA/AD vehicle 152-1 uses the CASN technology 150 to invite CA/AD vehicles 152-2, 152-3, and 152-4 to establish a relationship 153 with the CA/AD vehicle 152-1. As the invitations to connect are accepted by the CA/AD vehicles 152-2, 152-3, and 152-4, the CA/AD vehicle 152-1 may share CASN profile information with respective CA/AD vehicles 152-2, 152-3, and 152-4. In addition, each of the CA/AD vehicles 152-2, 152-3, and 152-4 may share their own CASN profile information with the CA/AD vehicle 152-1 after the connection 153 is established.

A CASN profile describes a corresponding CA/AD vehicle 152, and includes, for examples, vehicle characteristics (e.g., build, make, model, fuel economy, embedded or attached hardware elements, hardware element configuration, etc.), vehicle metrics (e.g., mileage, wear and tear assessments, etc.), user data (e.g., demographic information, user generated content, social networking data, etc.), and/or user metrics (e.g., driving abilities of the owner/operator of a CA/AD vehicle 152, engagement levels, social networking/social media metrics, etc.). The CASN profile also describes authenticated and/or proprietary information, which includes, for example, an AI or other driving assistance implementations (e.g., a level of autonomy of a CA/AD vehicle 152, a particular AI algorithm or ML model and/or training sets used to assist or automate one or more vehicle control functions of the CA/AD vehicle 152-1, or the like), a description of various autonomous or driver assistance features (e.g., adaptive cruise control, lane assist, automatic breaking, etc.), and AI/ML related metrics (e.g., driving abilities of AI operators of various control systems of a CA/AD vehicle 152, etc.).

As an example, the CA/AD vehicle 152-4 may implement an AI agent that has learned over time to control and drive autonomously on icy roads, which may be due to a number of factors including human assistance (e.g., for level 4 or 5 autonomous vehicles), a particular sensor 110 configuration, weather prediction algorithms, and/or the like. In this example, CA/AD vehicle 152-6 may not have very much experience autonomously driving in icy conditions due to being primarily located in a region with warm climates. The CA/AD vehicle 152-4 may share the AI algorithm(s) for driving on icy roads via a connection 153 between the CA/AD vehicles 152-4 and 152-6. The sharing of this CASN information may occur over a short-range communications link when the CA/AD vehicle 152-6 travels to a colder climate or is otherwise proximate to CA/AD vehicle 152-4, or the sharing may occur over a larger network (e.g., network 158), such as the Internet. Regardless of the particular control system or learnt behavior to be shared, using the CASN allows the CA/AD vehicles 152 to share authenticated/proprietary information (or experience) with other CA/AD vehicles 152 along with the vehicular metrics and metadata in the form of AI or ML learnt models. The sharing of authenticated/proprietary information is enabled either by broadcasting the authenticated/proprietary information itself, or by broadcasting the accomplishment and then providing the authenticated/proprietary information upon requests from individual CASN vehicles 152. The exchange of authenticated/proprietary information upon request also allows the CA/AD vehicle 152 users to monetize their data or the AI/ML, training sets.

The CASN information exchange enabled by the CASN technology 150 results in transferred learning and better driving or control performance for AI agents. In addition, the CASN technology 150 can use cooperative awareness to provide more intelligent services for CA/AD vehicles 152 and other end-users. For example, individual CA/AD vehicles 152 may collect knowledge of their local environment (e.g., based on sensor data generated by the sensors 111 of individual CA/AD vehicles 152) to process and share that knowledge in order to provide more intelligent services, such as cooperative collision warnings, autonomous driving functionality, traffic flow management, infrastructure analysis, platooning, and the like.

The CASN technology 150 may also enable numerous other use cases. A first example use case involves sharing capabilities and configurations, which includes sharing knowledge of the capabilities and/or configurations of a CA/AD vehicle 152, such as new autonomous vehicle (AV) trends, new releases of AI agents or operating systems, hardware configurations, system information, and the like. The hardware configurations may include the manufacturer and model of different communication devices, sensors 110, DCUs 120, etc. The system information may include real-time (or near real-time) information of CPU state (e.g., clock speed, utilization, etc.), GPU state, memory state, attached hardware states (e.g., of USB devices), and the like.

A second example use case enabled by the CASN technology 150 involves sharing cloud analytics information. Cloud analytics information includes information/data for targeting different services. In one example, the cloud analytics information may include analysis of human and/or AI driving behavior for targeted insurance discounts. In another example, the cloud analytics information may include hardware update and/or application recommendations based on owner/operator demographics, occupant condition assessment data, external environment assessment data, vehicle condition assessment data, and/or the like.

A third example use case enabled by the CASN technology 150 involves providing dynamic traffic management (also referred to as "vehicle congestion management" or the like). Dynamic traffic management is the control of vehicular traffic based on current (real-time) vehicular traffic conditions. Dynamic traffic management may include, for example, dynamic route selection or driving plans based on user or AI driving characteristics, operator driving characteristics, current geolocation, maximum roadway capacity, current vehicular density (number of vehicles per unit length of the roadway), current traffic flow rate (the number of vehicles per unit of time), current and/or predicted traffic conditions, current or desired fuel economy, current and/or predicted road conditions, current and/or predicted weather conditions, current or predicted hot spots or bottlenecks, and/or other like parameters. Dynamic traffic management may also include lane selection, parking location selection, speed control, etc. based on the aforementioned parameters.

A fourth example use case enabled by the CASN technology 150 involves providing social networking for social traveling experiences among CASN users. This could include sharing traveler mood state, traveler alertness levels, or the like. The CASN technology 150 may include a microblogging type platform for travelers to share text, images, audio, and video content with one another. For example, travelers can share reviews and recommendations of destinations of interest using, for example, rankings or ratings for individual destinations. The CASN technology 150 may also enable V2V direct communications to communicate in real-time or broadcast live messages. For example, some travelers may provide messages of encouragement for lonely and weary travelers, or provide warnings about other angry travelers. The CASN technology 150 may also provide recommendations for connections 153 with other CASN users (e.g., making new friends) to arrange travel groups (i.e., caravans), to meet up at a desired destination, or match up travelers based on shared interests to communicate during long journeys (e.g., by hosting in-vehicle chat sessions, mobile gaming, or the like).

A fifth example use case enabled by the CASN technology 150 involves enabling real-time ridesharing and/or peer-to-peer (p2p) ridesharing. In this example, the CASN may include a ride-matching platform, which may be an online marketplace where users can advertise travel opportunities, allow drivers and passengers to partner for a travel opportunity, and/or make a secured transactions to share planned/predicted travel costs. The ridesharing platform could also include user discovery (or hailing) mechanisms to locate a geolocation of potential ridesharing partners, for example, using positioning circuitry of the CA/AD vehicles 152 and/or positioning circuitry of smartphones, tablets, wearables, etc. of pedestrian CASN users. The ridesharing platform may implement the community-based trust mechanisms of the CASN technology 150, for example, user rating, vehicle ratings, and/or the like.

Figure 6:
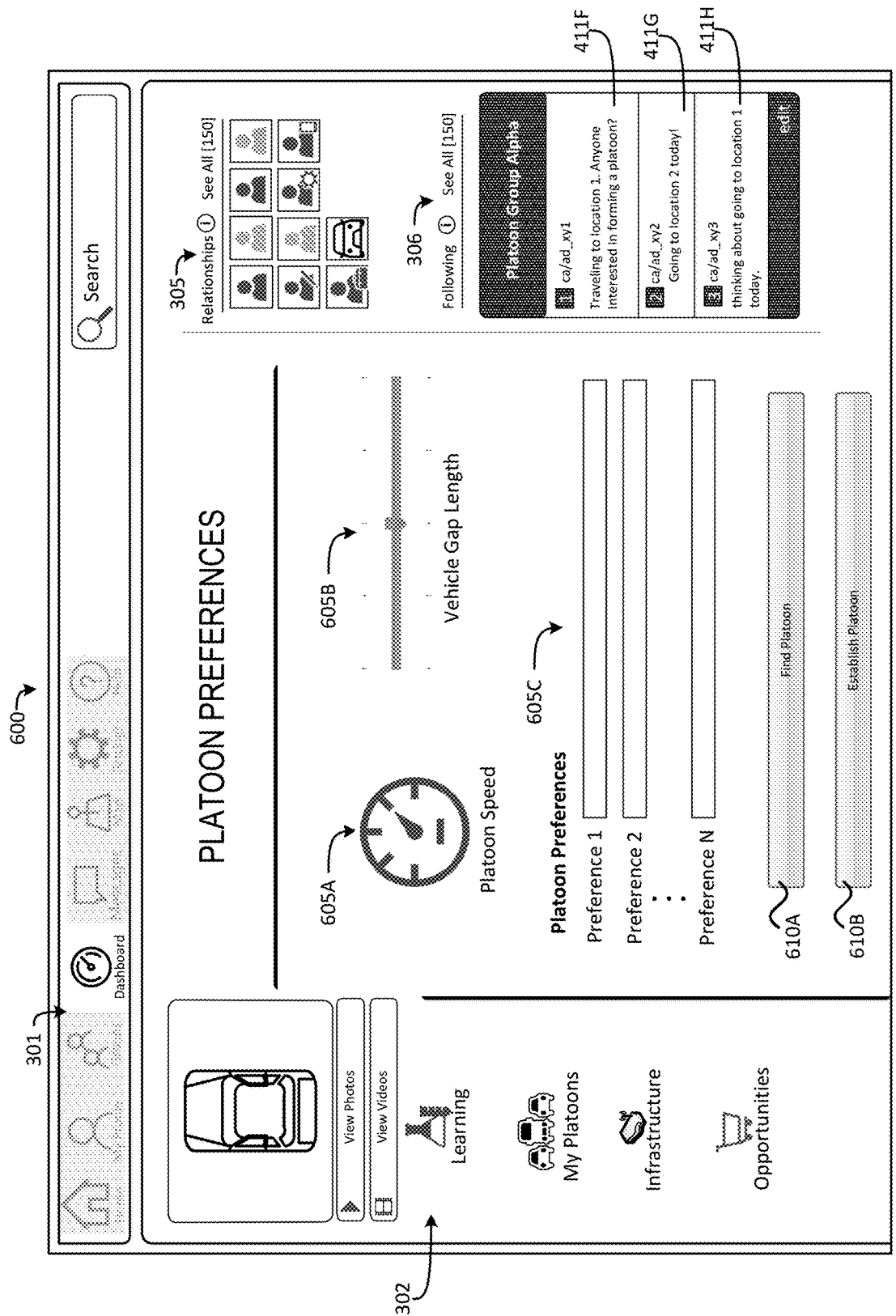
FIG. 6 shows an example platoon preferences GUI according to some embodiments.

A sixth example use case enabled by the CASN technology 150 involves sharing infrastructure knowledge, which is discussed in more detail with respect to FIG. 6. A seventh example use case enabled by the CASN technology 150 involves providing dynamic platooning opportunities, which is discussed in more detail with respect to FIG. 7.

The CASN technology 150 may also provide a platform for monetizing the sharing of information/data in the aforementioned example use cases. In one example, dynamic incentives may be provided for CA/AD vehicles 152 to take alternate routes, delay travel, rideshare, based on traffic conditions, delay tolerance, etc. In another example, the CASN technology 150 may provide traveler rankings to individual CASN users of the CA/AD vehicles 152 for targeted advertising. In another example, the CASN technology 150 may include a monetization platform where CASN users may select advertisers or types of advertisements to be displayed with or during user generated content (e.g., travel reviews). This monetization platform may provide tools that allow the CASN users to identify metrics associated with their content, such as page views, conversion rates, rankings or ratings associated with the content, etc. In this example, the CASN technology 150 may provide traveler rankings to individual CASN users, which gives advertisers the ability to help compensate CASN users for their reviews.

Still referring to FIG. 1, the CA/AD vehicles 152 may communicate their CASN profiles and other information via respective connections 153. In the example of FIG. 1, the connections 153 represent both social networking relationships between two or more CA/AD vehicles 152 (or CASN users), as well as individual communication channels between the CA/AD vehicles 152. In embodiments, the communication channels or links may be cellular V2X sidelink (SL) or Proximity Services (ProSe) channels, DSRC channels, or some other suitable direct communication channels, such as one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT/ANT+ protocols; Z-Wave; UPnP; and/or the like).

The connections 153 that are enabled by use of the CASN technology 150 also allows the CA/AD vehicles 152 to form a cloud network for collaborating. Examples of CA/AD vehicle collaboration include infrastructure analysis, traffic management, and platooning, each of which are described in more detail infra. In embodiments, clusters of the CA/AD vehicles 152 are equipped to communicate with one another as well as with stationary infrastructure, such as wireless access node (WAN) 156. This enables the CA/AD vehicles 152 to form ad-hoc networks, allowing them to function as a single device, which may be termed a "fog device," a "fog computing system," or a "fog." The social networking framework of the CASN technology 150 allows the owners/operators of the CA/AD vehicles 152 to opt-in to the fog device.

The fog device is a mechanism for bringing cloud computing functionality closer to data generators and consumers wherein various network devices run cloud application logic on their native architecture. Fog computing systems are used to perform low-latency computation/aggregation on data while routing it to an edge cloud computing service (e.g., MEC host 157 in FIG. 1) and/or a central cloud computing service (e.g., servers 160 in FIG. 1) for performing heavy computations or computationally burdensome tasks. The edge cloud computing service consolidates various human-operated, voluntary resources, as a cloud. These voluntary resource may include, inter-alia, IVI systems 100, desktop PCs, tablets, smartphones, wearable devices, nano datacenters, and the like. In various implementations, resources in the edge cloud may be in one to two-hop proximity to the CA/AD vehicles 152, which may result in reducing overhead related to processing data and may reduce network delay.

In embodiments, the fog device is a consolidation of CA/AD vehicles 152 and/or other networking devices, such as WAN 156, routers, switches, hubs, etc. with high computing capabilities and the ability to run cloud application logic on their respective native architectures. Fog devices are used to effectively handle computationally intensive tasks offloaded by edge resources. Fog resources may be manufactured, managed, and deployed by cloud vendors, and may be interconnected with high speed, reliable links. Moreover, fog resources reside farther from the edge of the network when compared to edge systems, but may be closer than the central cloud service.

The fog device may be an edge-fog network that includes an edge layer and a fog layer. The edge layer of the edge-fog network includes a collection of loosely coupled, voluntary and human-operated resources (e.g., the aforementioned edge devices). The fog layer resides on top of the edge layer and is a consolidation of networking devices, such as the CA/AD vehicles 152. Data is captured, stored/recorded, and communicated among the CA/AD vehicles 152 that have CASN connections 153 with one another. Analysis of the traffic flow and control schemes may be implemented by aggregators that are in communication with the CA/AD vehicles 152 and each other through a mesh network. The aggregators may be stationary infrastructure or may be designated CA/AD vehicles 152 in the CASN. In the example of FIG. 1, the WAN 156 or the CA/AD vehicle 152-1 may be designated as an aggregator. Data can be uploaded to the cloud service (servers 160) via the aggregator, and commands can be received from the cloud service through the aggregator. In some implementations, the cloud service may provide little or no computational capabilities and only serves as a repository for archiving data recorded and processed by the fog device. In these implementations, the cloud service acts as a centralized data storage system and provides reliability and access to data by the computing resources (e.g., CA/AD vehicles 152) in the fog and/or edge devices. Being at the core of the architecture, the data store is accessible by both edge and fog layers of the aforementioned edge-fog network.

Still referring to FIG. 1, the connection 154 is illustrated as an air interface to enable communicative coupling between the CA/AD vehicle 152-1 and the WAN 156. In some embodiments, connection 154 may be a communication channel or link that is consistent with a suitable cellular communications protocol, such as the Global System for Mobile Communications (GSM) protocol, Push-to-Talk (PTT) or PTT over Cellular (POC) protocol, the Universal Mobile Telecommunications System (UMTS) protocol, the 3GPP Long Term Evolution (LTE) protocol, the 3GPP Fifth Generation (5G)/New Radio (NR) protocol, the Worldwide Interoperability for Microwave Access (WiMAX) protocol, and/or any of the other communications protocols discussed herein. In such embodiments, the WAN 156 would comprise a cellular base station or Road Side Unit (RSU), such as a Universal Terrestrial Radio Access Network (UTRAN) node, a GSM Evolution Radio Access Network (GERAN) node, an Evolved UTRAN (E-UTRAN) node, a Next Generation (NG) Radio Access Network (RAN) node or 5G RAN, a WiMAX RAN node, and/or the like. In some embodiments, connection 154 may be a local wireless area network (WLAN) connection, such as a connection consistent with any IEEE 802.11 protocol, wherein the WAN 156 would comprise a wireless fidelity (WiFi®) access point or a Direct Short Range Communications (DSRC) RSU.

In either embodiment, the WAN 156 is configured to fulfill various radio network controller (RNC) functions such as radio bearer management, uplink and downlink dynamic radio resource management and data packet scheduling, mobility management, and the like. When the WAN 156 is an RSU, the WAN 156 may include internal data storage circuitry to store intersection map geometry, traffic statistics, media, as well as applications/software to sense and control ongoing vehicular and pedestrian traffic. The RSU may operate on the 5.9 GHz DSRC band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a WiFi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Still referring to FIG. 1, the Multi-access Edge Computing (MEC) host 157 (also referred to as a "Mobile Edge Computing Host" or the like) is virtual or physical device that hosts various MEC applications and provides MEC services to the MEC applications. MEC is a network architecture that allows cloud computing capabilities and computing services to be performed at the edge of a network. MEC provides mechanisms that allow applications to be run and to perform related processing tasks closer to network subscribers (also referred to as "edge users" and the like). In this way, network congestion may be reduced and applications may have better performance.

Where the MEC host 157 is implemented as one or more virtual machines (VMs) or the like, the physical devices that implement or operate the MEC host 157 may be referred to as "edge servers." The edge servers may include virtualization infrastructure that provides virtualized computing environments and virtualized resources (e.g., "virtualized infrastructure") for the MEC host 157. The MEC applications may run as VMs on top of the virtualized infrastructure. In FIG. 1, the MEC host 157 is co-located with the WAN 156. This implementation may be referred to as a small-cell cloud (SCC) when the WAN 156 is a small cell base station (e.g., pico-cell, femto-cell, etc.) or a WiFi AP, or may referred to as a mobile micro cloud (MCC) when the WAN 156 is a macro-cell base station (e.g., an eNB, gNB, etc.). The MEC host 157 may be deployed in a multitude of arrangements other than as shown by FIG. 1. In a first example, the MEC host 157 may be co-located or operated by an RNC, which may be the case for legacy network deployments, such as 3G networks. In a second example, the MEC host 157 may be deployed at cell aggregation sites or at multi-RAT aggregation points that can be located either within an enterprise or used in public coverage areas. In a third example, the MEC host 157 may be deployed at the edge of a cellular core network. These implementations may be used in follow-me clouds (FMC), where cloud services running at distributed data centers follow the CA/AD vehicles 152 as they roam throughout the network.

According to various embodiments, the MEC host 157 is used for CASN application computation offloading, wherein the MEC host 157 executes compute-intensive tasks of the CASN technology 150, while less computationally intensive functionalities of the CASN technology 150 are executed by the CA/AD vehicles 152. The compute-intensive tasks are offloaded to the MEC host 157 since MEC host 157 has higher/greater performance capabilities as compared to the CA/AD vehicles 152. Example use cases of application computation offloading using MEC may include, inter alia, offloading computationally hungry applications or portions thereof, offloading intermediate data processing applications or portions thereof, and offloading moderate data processing applications or portions thereof. Computation-hungry applications are applications with relatively huge data processing requirements and huge data transfer requirements, such as graphics/video processing/rendering applications, high-speed (low latency) browser applications, artificial/augmented reality applications, low latency cloud based gaming applications, three-dimensional (3D) gaming, and the like. Intermediate data processing applications are applications with large data processing and/or large data transfer requirements that are less stringent than computation-hungry applications including, for example, sensor data cleansing (e.g., pre-processing, normalization), video analysis, and value-added services (e.g., translation, log analytics, and the like). Moderate data processing applications have smaller data processing and/or data transfer requirements than intermediate data processing applications, such as antivirus applications. As examples, the compute-intensive tasks of the CASN technology 150 may include some or all the tasks used for infrastructure analysis, and some or all of the tasks used for platoon formation and maintenance. Embodiments related to infrastructure analysis and platooning are discussed in more detail with regard to FIGS. 7 and 8 infra.

For computation offloading, a new instance of the CASN technology 150 application is started at the MEC host 157 in response to requests from one or more users of CA/AD vehicles 152. The MEC host 157 may be selected by a MEC system to start the instance of the CASN application based on a set of requirements (e.g., latency, processing resources, storage resources, network resources, location, network capability, security conditions/capabilities, etc.) that need to be fulfilled for the CASN application. In response to the requests from the user(s), connectivity is established between the CA/AD vehicles 152 and the instance of the already running CASN application at the MEC host 157. The CASN application instance is terminated when all users connected to the specific instance of the CASN application have disconnected.

Still referring to FIG. 1, the network 158 comprises computers, network connections among the computers, and software routines to enable communication between the computers over network connections. In this regard, the network 158 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without radio frequency (RF) communications circuitry), routers, switches, hubs, radio beacons, base stations, picocell or small cell base stations, and/or any other like network device. Connection to the network 158 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 158 may require that the computers execute software routines which enable, for example, the seven layers of the OSI model of computer networking or equivalent in a wireless (cellular) phone network.

Network 158 may be used to enable relatively long-range communication such as, for example, between the one or more servers 160 and one or more CA/AD vehicles 152. The network 158 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the network 158 may be associated with network operator who owns or controls equipment and other elements necessary to provide network-related services, such as one or more base stations or access points, one or more servers for routing digital data or telephone calls (for example, a core network or backbone network), etc.

Still referring to FIG. 1, the one or more servers 160 comprise one or more physical and/or virtualized systems for providing functionality (or services) to one or more clients (e.g., CA/AD vehicles 152) over a network (e.g., network 158). The server(s) 160 may include various computer devices with rack computing architecture component(s), tower computing architecture component(s), blade computing architecture component(s), and/or the like. The server(s) 160 may represent a cluster of servers, a server farm, a cloud computing service, or other grouping or pool of servers, which may be located in one or more datacenters. The server(s) 160 may also be connected to, or otherwise associated with one or more data storage devices (not shown). Moreover, the server(s) 160 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Generally, the server(s) 160 offer applications or services that use IP/network resources. In embodiments, the server(s) 160 provide social networking and/or microblogging services to the CA/AD vehicles 152 that implement the CASN technology 150 of the present disclosure, which are described in more detail infra. The server(s) 160 may also provide traffic management services, cloud analytics, content streaming services, providing immersive gaming experiences, and/or other like services. In addition, the various services provided by the server(s) 160 may include initiating and controlling software and/or firmware updates for applications or individual components implemented by the CA/AD vehicles 151. The server(s) 160 could also be configured to support communication services such as Voice-over-Internet Protocol (VoIP) sessions, PTT sessions, group communication sessions, and the like for the CA/AD vehicles 152 via the network 158.

Figure 2:
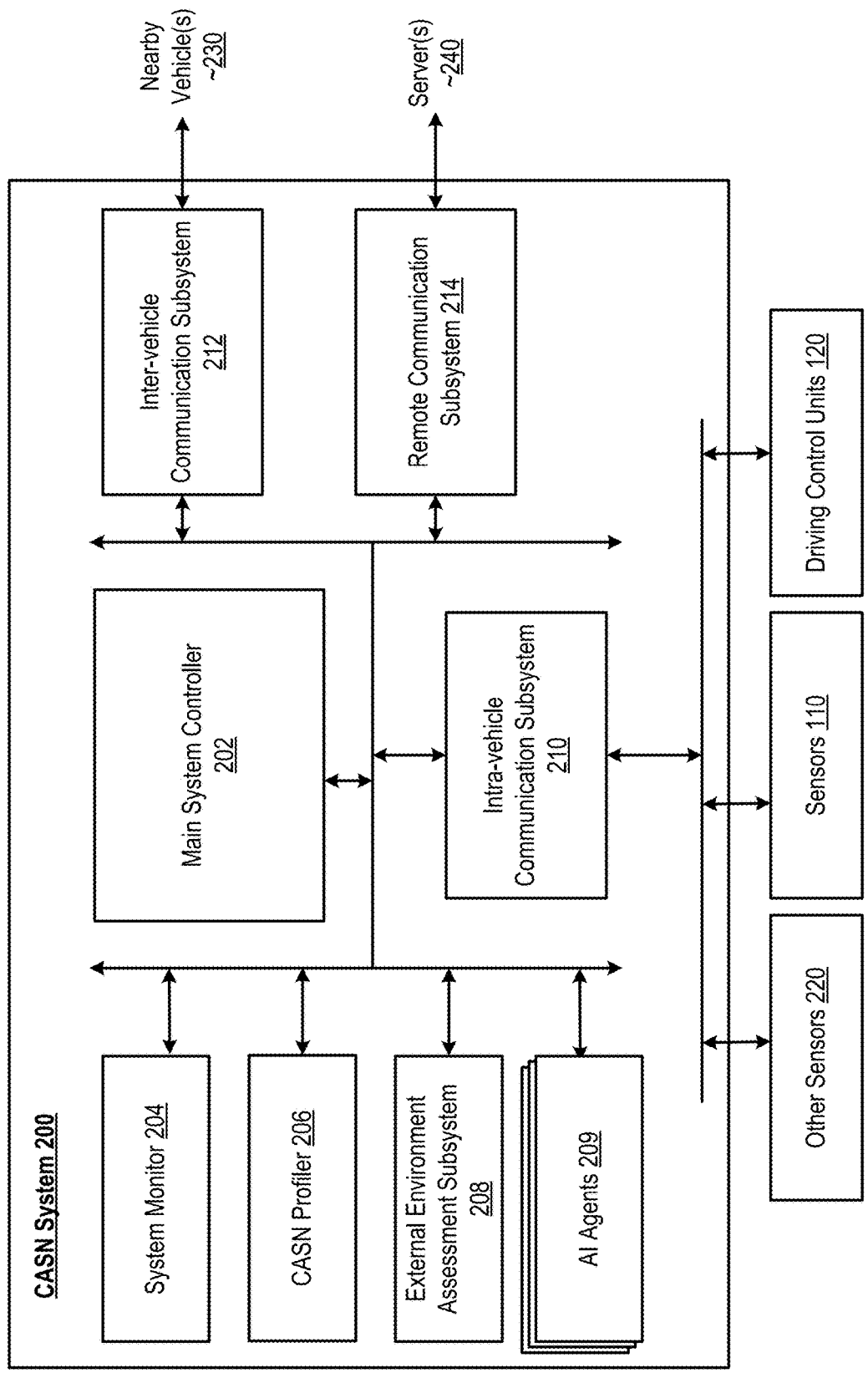
FIG. 2 illustrates a component view of an example CASN system, according to various embodiments.

Referring now to FIG. 2, wherein a component view of an example CASN system 200, according to various embodiments, is illustrated. In embodiments, the CASN system 200 may be CASN technology 150 discussed with regard to FIG. 1. As shown, the CASN system 200 includes main system controller 202, system monitor 204, CASN profiler 206, external environment assessment subsystem 208, one or more AI agents 209, intra-vehicle communication subsystem 210, inter-vehicle communication subsystem 212, and remote communication subsystem 214. In other embodiments, CASN system 200 may include more or less subsystems than are shown by FIG. 2.

The main system controller 202 is configured to share authenticated and/or proprietary information, such as a CASN profile, of the host CA/AD vehicle (on which CASN system 200 is disposed) with one or more other nearby vehicles 230 that are members of a CASN via the inter-vehicle communication subsystem 212 and/or with one or more servers 240 via the remote communication subsystem 214. In embodiments, the nearby vehicles 230 may correspond to any of the CA/AD vehicles 152 in FIG. 1 and the server(s) 240 may correspond to the server(s) 160 or the MEC host 157 in FIG. 1.

Vehicles 152 equipped with CASN technology 150 may be configured to support inter-vehicle communication in accordance with one or more industry standards, such as cellar vehicle-to-vehicle (V2V) or vehicle-to-everything (V2X) specifications provided by the Third Generation Partnership Project (3GPP) New Radio (NR) and/or Long Term Evolution (LTE) standards, Direct Short Range Communications (DSRC) and/or Wireless Access in Vehicular Environments (WAVE) specified by IEEE 802.11p and IEEE 1609.4, respectively, or some other suitable standard or combination(s) thereof. For these embodiments, main system controller 202 is further configured, with the assistance of inter-vehicle communication subsystem 212, to scan and discover whether the other nearby vehicles 230 support an inter-vehicle communication industry standard. For DSRC/WAVE implementations, the scan could include, for example, performing energy detection (ED) during a listen-before-talk (LBT) operation to detect an unoccupied channel. For LTE/NR implementations, the scan could include, for example, receiving a Radio Resource Control (RRC) configuration message indicating whether network resource allocation or autonomous resource selection is to be used, identifying resources for communicating sidelink control information (SCI) when network resource allocation is configured, performing an ED-based sensing operation to reserve resources for communicating SCI when autonomous resource selection is configured, and transmit or receive SCI over the identified/reserved resources. Further, main system controller 202 may be configured, with the assistance of inter-vehicle communication subsystem 212, to authenticate the other nearby vehicles 230, confirming that some or all of the nearby vehicles 230 include the CASN technology 150 and can be trusted to exchange CASN information. Upon authentication of the other nearby vehicles 230, the main system controller 202 may control the inter-vehicle communication subsystem 212 to exchange CASN profiles, including authenticated and/or proprietary information. In some embodiments, the CASN profile information may be exchanged in a secure manner, in accordance with a security protocol specified by the mutually support inter-vehicle communication standard. For example, the vehicle incident information may be encrypted prior to transmission to the other vehicle or the like.

Continuing with the example of FIG. 2, system monitor 204 is configured to monitor system resources and performance of the CASN system 200, and to identify detailed information about the hardware and software subsystems implemented by the host vehicle (on which CASN system 200 is disposed). For example, the system monitor 204 may monitor and compile information about installed hardware, devices (e.g., individual sensors 111 and individual DCUs 120 embedded or attached to the host vehicle), drivers, applications, system settings, system software programs, AI agents 209, kernel extensions/modules, current processor usage, current processor frequency, current processor temperature, currently running processes or tasks, current memory utilization and/or available memory space, memory Self-Monitoring Analysis and Reporting Technology (SMART) indicators, system uptime, current network addresses (e.g., IP addresses or the like), current network connections, battery charge, fuel levels, system name or identifier(s), user identifier(s), the date and time, geolocation coordinates, etc. System monitor 204 is also configured to compile the system information into a suitable format (e.g., plain text, rich text format (RTF), XML, JSON, etc.), and to export, with the assistance of intra-vehicle communication subsystem 210, the compiled information to the CASN profiler 206. The system monitor 204 is also configured to receive requests from individual subsystems (e.g., one or more AI Agents 209, the main system controller 202, one or more DCUs 120, etc.) and provide the compiled system information to the individual subsystems in response to those requests.

Continuing with the example of FIG. 2, CASN profiler 206 is configured to generate a CASN profile for the host vehicle and/or an owner/operator of the host vehicle. In embodiments, the CASN profiler 206 generates the CASN profile based on system information compiled by the system monitor 204. A more detailed discussion of the vehicle information included in the CASN profile is discussed in more detail infra. In embodiments, the CASN profiler 206 is also configured to generate the CASN profile based on, or to include, a fingerprint of the host vehicle. In general, a "fingerprint" is a string or data structure that is tied to a relatively large data item or data set, which may include information about a computing device for the purposes of identifying that computing device. In these embodiments, the CASN profiler 206 may produce a fingerprint based on a combination of the system information, control data obtained from the DCUs 120, sensor data obtained from the sensors 110 and/or other sensors 220, electrical impulses applied to various chips or components of the CASN system 200, and/or signals or data obtained from other subsystems of the CASN system 200. In these embodiments, the CASN profiler 206 may calculate the fingerprint using the various data/signals as an input to a suitable hash function, such as a cryptographic hash function (e.g., message digest algorithm 5 (MD5); Advanced Encryption Standard (AES), Secure Hash Algorithm (SHA)-1, SHA-2, SHA-3, BLAKE, BLAKE2, or the like or variants thereof), a rolling hash function (e.g., Rabin fingerprinting algorithm, cyclical polynomial, or the like or variants thereof), etc.

Continuing with the example of FIG. 2, external environment condition assessment subsystem 208 is configured to assess conditions of an area immediate surrounding the host vehicle, which may be based on received sensor data. The external environment condition assessment subsystem 208 is configured to receive sensor data from sensors 110 of the host vehicle with the assistance of intra-vehicle communication subsystem 210, and to receive sensor data held by one or more remote servers 240 with the assistance of remote communication subsystem 214. The external environment condition assessment subsystem 208 is also configured to receive sensor data held by other nearby vehicles 230 with the assistance of inter-vehicle communication subsystem 212, and could also receive sensor data held by surrounding infrastructure (e.g., WAN 156 of FIG. 1) with the assistance of inter-vehicle communication subsystem 212 or remote communication subsystem 214. What constitutes the immediate surrounding area may be application dependent, and varies from embodiments to embodiments. In some embodiments, the size of the immediate surrounding area assessed may be configurable by a user, the manufacturer of the host vehicle, or a developer of the external environment condition assessment subsystem 208.

Sensor data from sensors 110 of the host vehicle (and sensor data held by nearby vehicles 230) may include temperature readings collected by temperature sensor(s) of the vehicle, humidity readings collected by humidity sensor(s) of the vehicle, lighting measurements collected by light sensor(s) of the vehicle, rain measurements collected by rain sensor(s) of the vehicle, images collected by outward looking cameras of the vehicle, and the like. This sensor data may also include sensor data from various control systems of the vehicle, such as those discussed herein (see e.g., discussion of FIG. 11 infra). Sensor data held by remote servers 240 (and sensor data held by surrounding infrastructure) may similarly include temperature readings, humidity readings, precipitation readings, etc., of the surrounding area, and may also include traffic flow conditions, road condition data, and/or the like. External environment condition assessment subsystems 208 is configured to process the sensor data to determine the type and amount of precipitation in the area, an amount of daylight, proximity to nearby vehicles 230, proximity to real-world (physical) objects, and so forth.

Continuing with the example of FIG. 2, the AI agents 209 is/are autonomous entities configured to observe environmental conditions and determine actions to be taken in furtherance of a particular goal. The particular environmental conditions to be observed and the actions to take may be based on an operational design domain (ODD). An ODD includes the operating conditions under which a given AI agent 209 or feature thereof is specifically designed to function. An ODD may include operational restrictions, such as environmental, geographical, and time-of-day restrictions, and/or the requisite presence or absence of certain traffic or roadway characteristics.

In embodiments, individual AI agents 209 are configured to control respective control systems of the host vehicle, some of which may involve the use of one or more DCUs 120 and/or one or more sensors 110. In these embodiments, the actions to be taken and the particular goals to be achieved may be specific or individualized based on the control system itself. Additionally, some of the actions or goals may be dynamic driving tasks (DDT), object and event detection and response (OEDR) tasks, or other non-vehicle operation related tasks depending on the particular context in which an AI agent 209 is implemented. DDTs include all real-time operational and tactical functions required to operate a vehicle 152 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, etc. (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents 209 is/are configured to receive, or monitor for, sensor data from sensors 110 and sensor 220 via intra-vehicle communication subsystem 210, and to receive control system data (CSD) from the DCUs 120 of the host vehicle via intra-vehicle communication subsystem 210. The act of monitoring may include capturing CSD and/or sensor data from individual sensors 110/210 and DCUs 120. Monitoring may include polling (e.g., periodic polling, sequential (roll call) polling, etc.) one or more sensors 110 for sensor data and/or one or more DCUs 120 for CSD for a specified/selected period of time. In other embodiments, monitoring may include sending a request or command for sensor data/CSD in response to an external request for sensor data/CSD. In some embodiments, monitoring may include waiting for sensor data/CSD from various sensors/modules based on triggers or events, such as when the host vehicle reaches predetermined speeds and/or distances in a predetermined amount of time (with or without intermitted stops). The events/triggers may be AI agent 209 specific, and may vary depending of a particular embodiment. In some embodiments, the monitoring may be triggered or activated by an application or subsystem of the CASN system 200 or by a remote device, such as MEC host 157 or server(s) 160 of FIG. 1.

In some embodiments, one or more of the AI agents 209 may be configured to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors (see e.g., discussion of FIG. 11). Examples of the CSD may are discussed in more detail with regard to FIG. 11. In an example, one or more of the AI agents 209 may be configured to process images captured by sensors 110 (image capture devices) and/or assessed conditions identified by the external environment condition assessment subsystem 208 to determine a state or condition of the surrounding area (e.g., existence of potholes, fallen trees/utility poles, damages to road side barriers, vehicle debris, and so forth). In another example, one or more of the AI agents 209 may be configured to process CSD provided by one or more DCUs to determine a current amount of emissions or fuel economy of the host vehicle. The AI agents 209 may also be configured to compare the sensor data and/or CSDs with training set data to determine or contribute to determining environmental conditions for controlling corresponding control systems of the vehicle.

To determine actions to be taken in furtherance of a particular goal, each of the AI agents 209 are configured to identify a current state of the CASN system 200, the host vehicles 200, and/or the AI agent 209 itself, identify or obtain one or more models, identify or obtain goal information, and predict a result of taking one or more actions based on the current state, the one or more models, and the goal information. The one or more models may be any algorithms or objects created after an AI agent 209 is trained with one or more training datasets, and the one or more models may indicate the possible actions that may be taken based on the current state. The one or more models may be based on the ODD defined for a particular AI agent 209. The current state is a configuration or set of information in the CASN system 200, or a measure of various conditions in the CASN system 200 or one or more other systems of the host vehicle. The current state is stored inside an AI agent 209 and is maintained in a suitable data structure. The AI agents 209 are configured to predict possible outcomes as a result of taking certain actions defined by the models. The goal information describes desired outcomes (or goal states) that are desirable given the current state. Each of the AI agents 209 may select an outcome from among the predict possible outcomes that reaches a particular goal state, and provide signals or commands to various other subsystems of the CASN system 200 to perform one or more actions determined to lead to the selected outcome.

In addition, the AI agents 209 may also include a learning module configured to learn from an experience with respect to the selected outcome and some performance measure(s). The experience may include sensor data and/or new state data collected after performance of the one or more actions of the selected outcome. The learnt experience may be used to produce new or updated models for determining future actions to take. According to various embodiments, the AI agents 209 may provide, with the assistance of intra-vehicle communication subsystem 210, the one or more models, goal information, and/or the learnt experience to the CASN profiler 206, wherein the CASN profiler 206 is configured to generate CASN information or update an existing CASN profile to include the one or more models, goal information, and/or the learnt experience.

As alluded to earlier, intra-vehicle communication subsystem 210 is configured to facilitate intra vehicle communication between main system controller 202, sensors 110, DCUs 120, and the various subsystems of the CASN system 200, as well as other sensors 220 of other devices (e.g., smartphones, tablets, or wearable devices carried or worn by occupants of the vehicle). In particular, intra-vehicle communication subsystem 210 is configured to receive data from sensors 110 and DCUs 120, and transmit commands to sensors 110 and DCUs 120 for operation/control of the host vehicle. Example of commands to sensors 110 may include, but are not limited to, calibration commands, commands to collect certain sensor data that are collected on demand (as opposed to being collected continuously or on a periodic basis), and/or commands to change a position or orientation of a particular sensor 111 (e.g., change a camera angle or view). Example of commands to DCUs 120 may include, but are not limited to, various operation commands to DCUs 120 controlling operations of the engine, the drive train, the braking system, fuel injection, and the like. In these embodiments, intra-vehicle communication subsystem 210 is coupled with sensors 110 and DCUs 120 via a suitable vehicle bus or interconnect (IX) technology, and is configured to communicate (i.e., send and receive messages/signaling) over the bus/IX using a corresponding bus/IX protocol. Examples of such vehicle bus/IX technologies may include a Controller Area Network (CAN), a Time-Trigger Protocol (TTP) system, a FlexRay system, or the like. Additionally or alternatively, any number of other bus/IX technologies may be used, such as a Local Interconnect Network (LIN); industry standard architecture (ISA); extended ISA (EISA); peripheral component interconnect (PCI); PCI express (PCIe); Inter-Integrated Circuit (I2C) bus; Parallel Small Computer System Interface (SPI) bus; point-to-point interfaces; a power bus; a proprietary bus, for example, used in a SoC based interface; or any number of other technologies. In some embodiments, intra-vehicle communication subsystem 210 is communicatively coupled with other sensors 220 via a wireless network, such as a PAN or P2P network, and is configured to communicate in accordance with a corresponding wireless network protocol, such as the PAN and/or P2P protocols discussed herein.

In some embodiments, the intra-vehicle communication subsystem 210 is also configured to facilitate intra vehicle communication between the various subsystems of the CASN system 200 using suitable drivers, libraries, application programming interfaces (APIs), middleware, software connectors, software glue, and/or the like. For example, in order to compile system information, the system monitor 204 is configured to utilize the intra-vehicle communication subsystem 210 to interface with individual hardware and software elements implemented by the host vehicle. The system monitor 204 is also configured to utilize the intra-vehicle communication subsystem 210 to provide the compiled system information to the CASN profiler 206 in accordance with the various embodiments herein.

As alluded to earlier, inter-vehicle communication subsystem 212 is configured to facilitate communication with nearby vehicles 230, which may include other vehicles that are members of the CASN, or nearby infrastructure or pedestrian held devices (e.g., smartphones, tablets, wearables, etc.). In some embodiments, inter-vehicle communication subsystem 212 is configured to support inter-vehicle communication in accordance with one or more industry standards, such as those mentioned herein.

As alluded to earlier, remote communication subsystem 214 is configured to facilitate communication with one or more remote servers 240, which may be server(s) 160 or MEC host 157 of FIG. 1. The remote servers 240 may be one or more servers affiliated with the CASN platform, cloud computing service, traffic management service, content streaming service, interactive gaming service, an insurance company, a law enforcement or governmental agency, a third party vehicle incident service, an environmental data service, and so forth. In some embodiments, remote servers 240 may also be server(s) associated with first responders, fire, ambulance, and so forth. In some embodiments, remote communication subsystem 214 may be configured to communicate with servers 240 wirelessly, via a wide area network, such as the Internet. Wireless communication may be WiFi or cellular, such as LTE, 5G, WiMAX, etc.

In various embodiments, each of main system controller 202, system monitor 204, CASN profiler 206, external environment assessment subsystem 208, and/or the AI agents 209 may include one or more trained neural networks in performing their respective determinations and/or assessments. An example of such neural networks is shown by FIG. 9.

Figure 9:
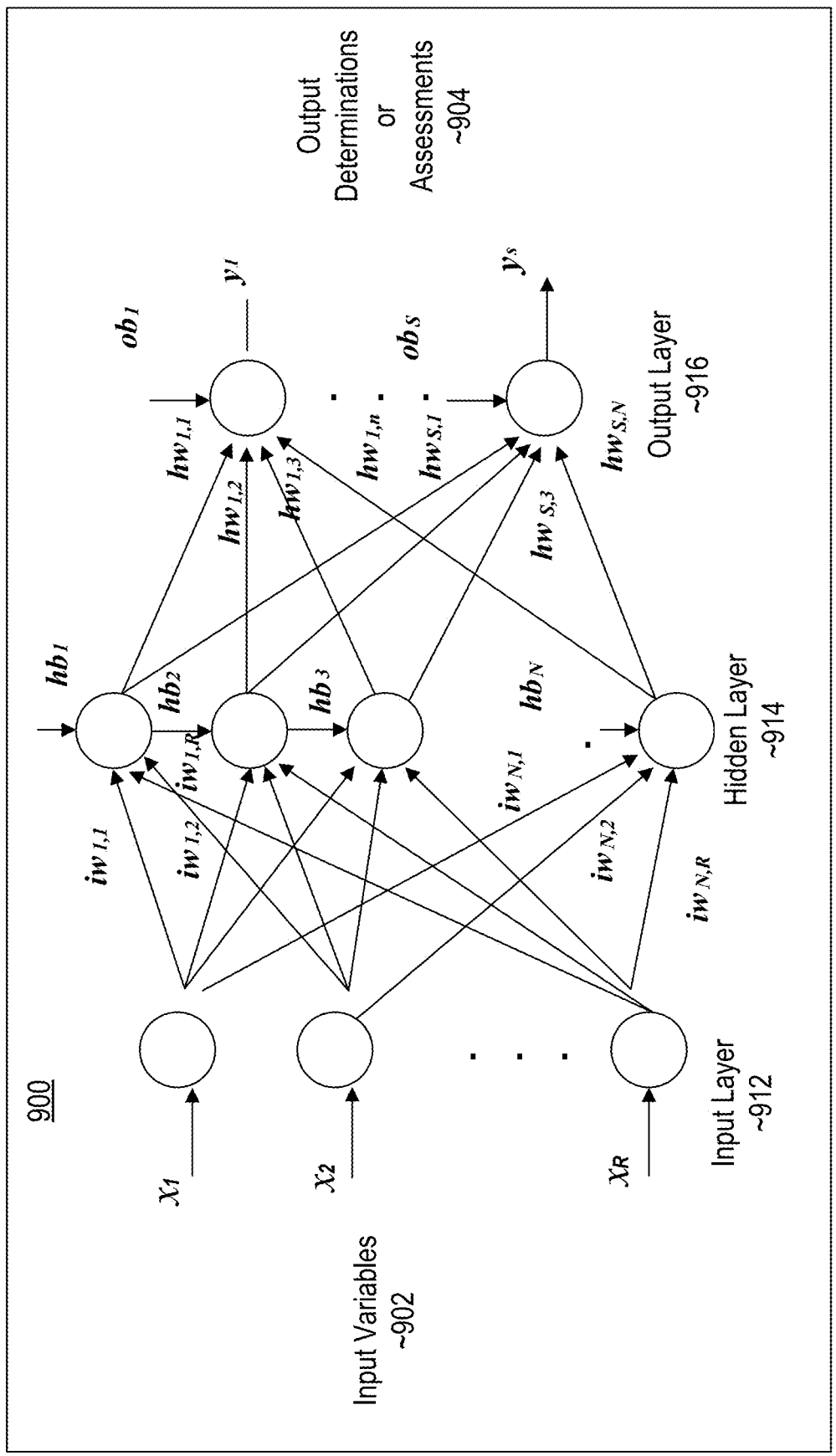
FIG. 9 illustrates an example neural network suitable for use with present disclosure, according to various embodiments.

FIG. 9 illustrates an example neural network, in accordance with various embodiments. As shown, example neural network 900 may be a multilayer feedforward neural network (FNN) comprising an input layer 912, one or more hidden layers 914 and an output layer 916. Input layer 912 receives data of input variables ($x_i$) 902. Hidden layer(s) 914 processes the inputs, and eventually, output layer 916 outputs the determinations or assessments ($y_i$) 904. In one example implementation the input variables ($x_i$) 902 of the neural network are set as a vector containing the relevant variable data, while the output determination or assessment ($y_i$) 904 of the neural network are also as a vector.

Multilayer feedforward neural network (FNN) may be expressed through the following equations:

$$ho_i = f\left(\sum_{j=1}^{R}(iw_{i,j}x_j) + hb_i\right), \text{ for } i = 1, \ldots, N$$

$$y_i = f\left(\sum_{k=1}^{N}(hw_{i,k}ho_k) + ob_i\right), \text{ for } i = 1, \ldots, S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \sum_{k=1}^{m}(E_k), \text{ where } E_k = \sum_{p=1}^{S}(t_{kp} - y_{kp})^2$$

where $y_{kp}$ and $t_{kp}$ are the predicted and the target values of pth output unit for sample k, respectively, and m is the number of samples.

In some embodiments, main system controller 202 may include a trained neural network 900 to determine when and how to share CASN profile information. The input variables ($x_i$) 902 may include the readings of the various vehicles sensors 110 and CSD from various DCUs 120, various messages or data received from nearby vehicles 230, and/or data/information received from as CASN platform. The output variables ($y_i$) 904 may include Boolean values indicating true or false for whether the CASN profile information should be shared.

In some embodiments, the CASN profiler 206 may include a trained neural network 900 to determine how to generate a CASN profile based on various system information obtained from the system monitor 204. In these embodiments, the input variables ($x_i$) 902 may include system information obtained from the system monitor 204. The output variables ($y_i$) 904 may include values indicating selection or non-selection of individual pieces of the system information for inclusion in the CASN profile.

In some embodiments, external environment assessment subsystem 208 may include a trained neural network 900 to assess condition of the immediate surrounding area of the host vehicle. The input variables ($x_i$) 902 may include objects recognized in images of the outward looking cameras of the vehicle, sensor data from various sensors 110, and/or sensor data received from nearby vehicles 230, infrastructure, and/or remote servers 240. The output variables ($y_i$) 904 may include values indicating selection or non-selection of a level for each light/visibility, precipitation, road conditions, and the like.

In some embodiments, each of the AI agents 209 may include respective trained neural networks 900 to determine an optimal outcome to take based on a current state of the vehicle, CASN system 200, and/or the AI agents 209 themselves. The input variables ($x_i$) 902 may include sensor data from various sensors 110, sensor data received from nearby vehicles 230, infrastructure, and/or remote servers 240, CSD from various DCUs 120, information/data from other subsystems in the vehicle, information/data from various applications running on the system 200, one or more relevant models, current state information, goal information, and/or any other suitable information/data. The output variables ($y_i$) 904 may include particular actions to take, which may be in the form of commands/signals to be sent to different subsystems, sensors 110, and/or DCUs 120 of the vehicle, messages/data to be sent to nearby vehicles 230, messages/data to be sent to remote servers 240, and/or the like.

In this example, for simplicity of illustration, there is only one hidden layer in the neural network. In some other embodiments, there can be many layers of hidden layers. Furthermore, the neural network can be in some other types of topology, such as Convolution Neural Network (CNN) or Recurrent Neural Network (RNN).

Referring back to FIG. 2, each of main system controller 202, system monitor 204, CASN profiler 206, external environment assessment subsystem 208, one or more AI agents 209, intra-vehicle communication subsystem 210, inter-vehicle communication subsystem 212, and remote communication subsystem 214 may be implemented in hardware, software, or combination thereof. Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In some embodiments, especially those embodiments where either controller 202 or one of subsystems 204-209 includes at least one neural network, at least a portion of controller 202 and subsystem 204-209 may be implemented in an accelerator. One example software architecture and an example hardware computing platform will be further described later with references to FIGS. 10 and 11.

Figure 3:
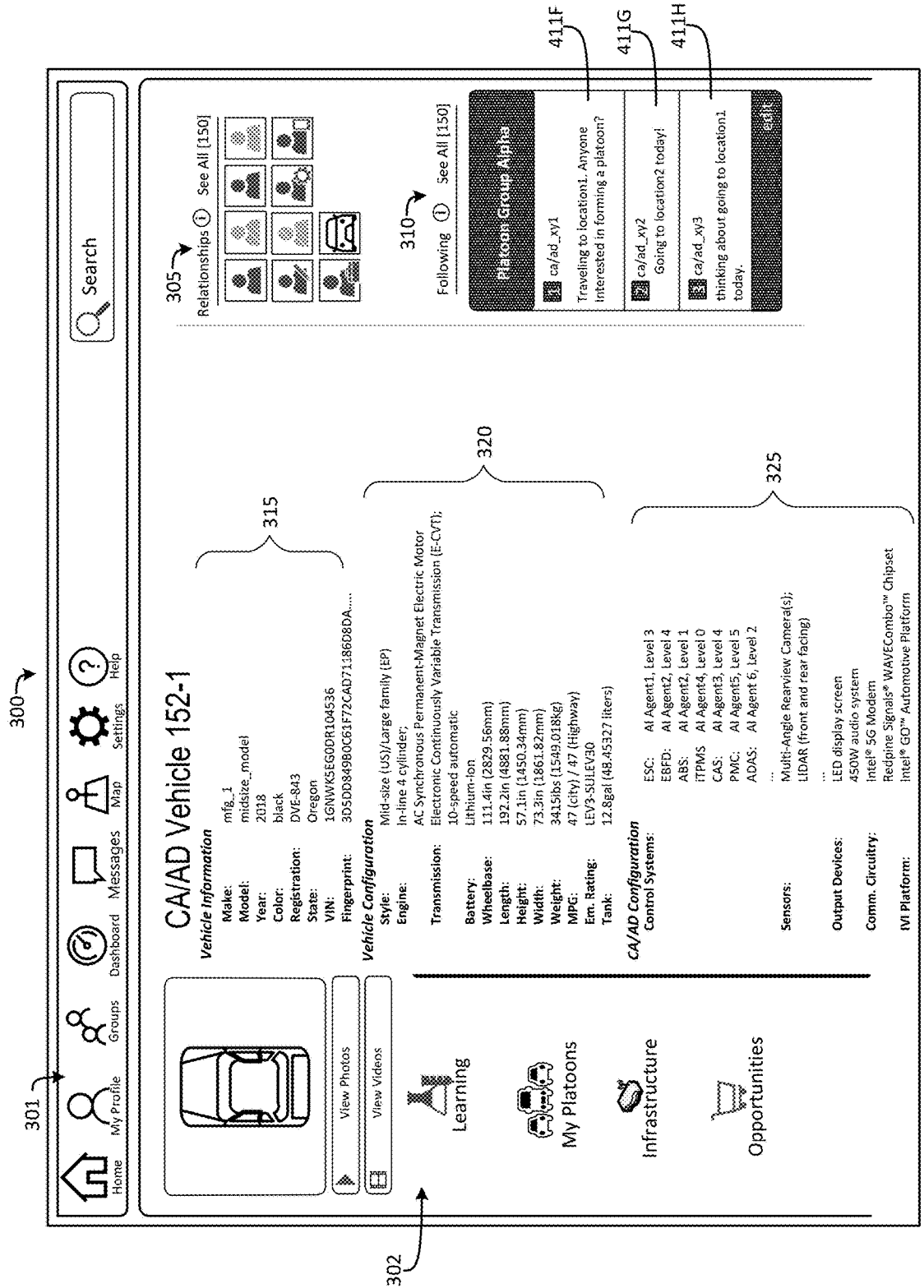
FIG. 3 shows an example CASN user profile graphical user interface (GUI) according to some embodiments.
Figure 4A:
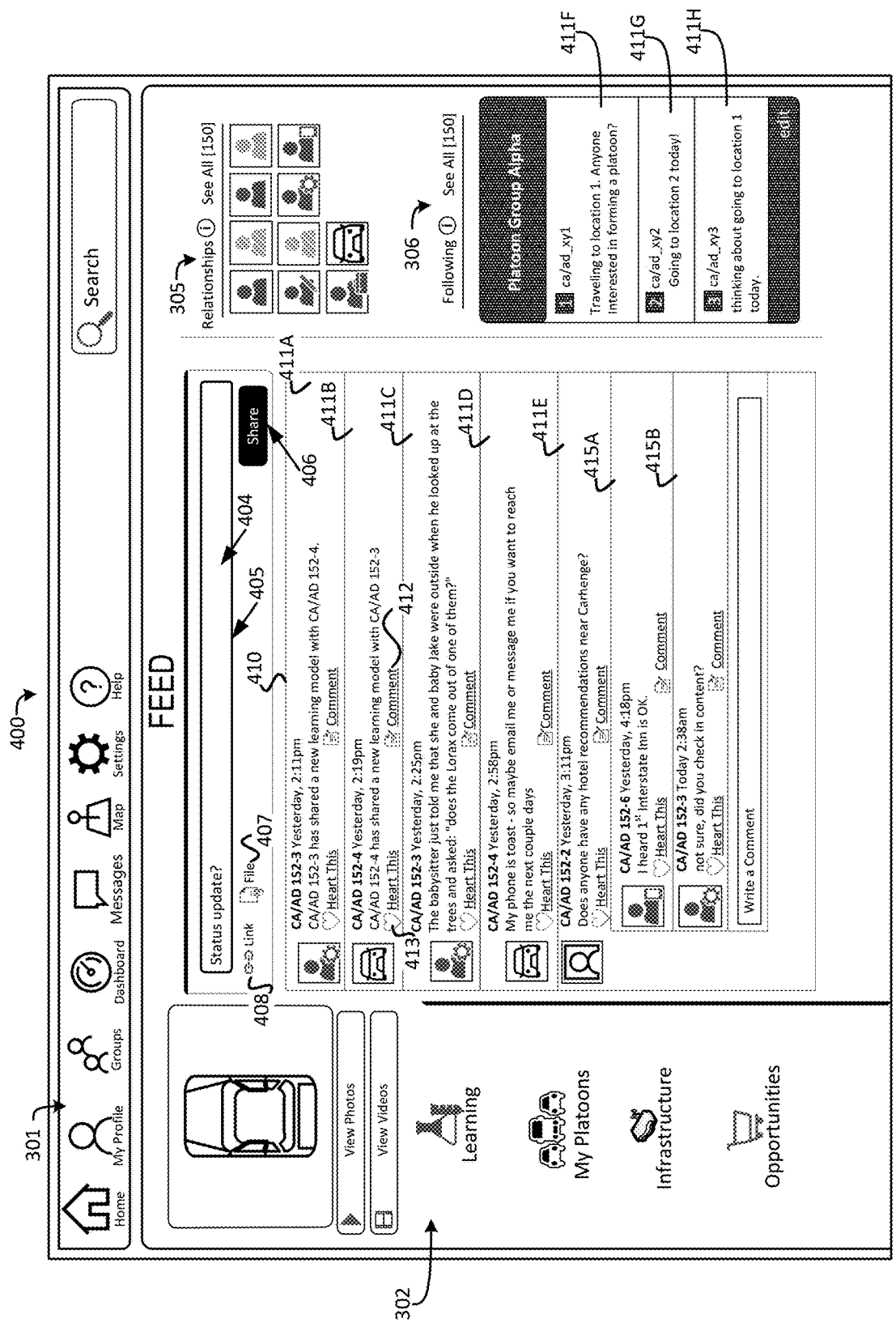
FIGS. 4A and 4B shows an example CASN feed GUI according to some embodiments.
Figure 4B:
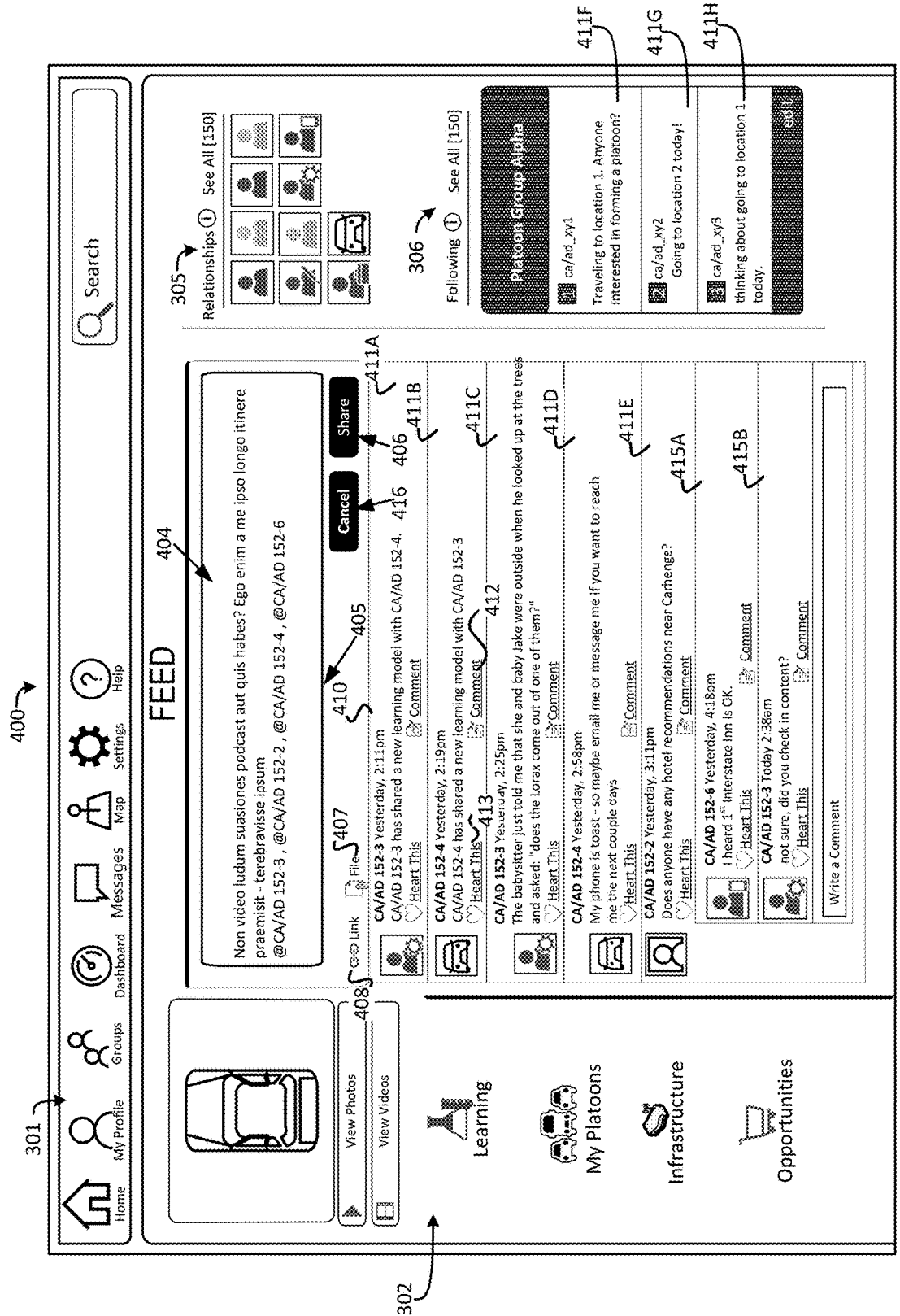
Figure 5:
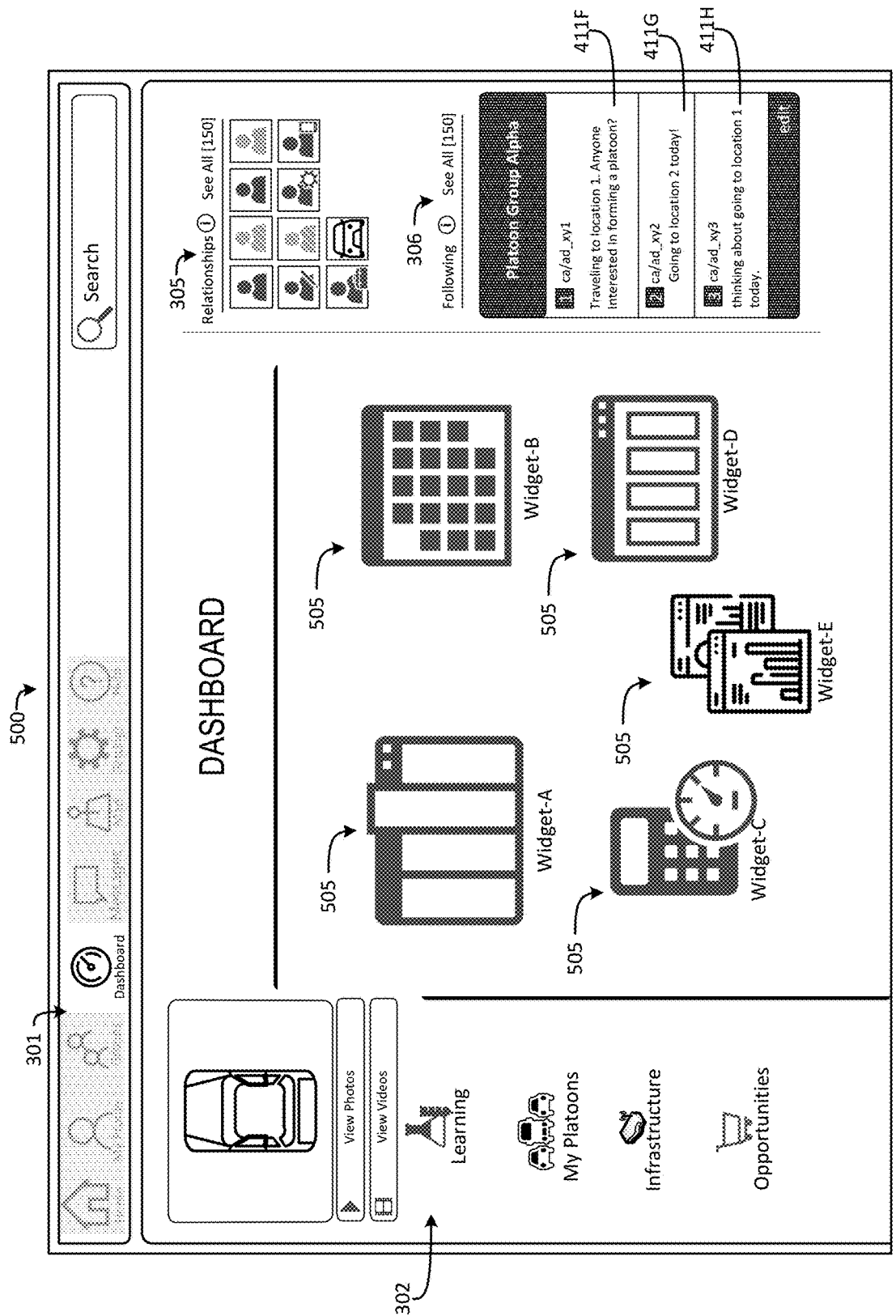
FIG. 5 shows an example dashboard GUI according to some embodiments.

FIGS. 3-6 show various graphical user interfaces (GUIs) that may be used to practice the various embodiments herein. In particular, FIG. 3 shows an example CASN user profile 300 according to some embodiments, FIGS. 4A and 4B shows an example CASN feed GUI 400 according to some embodiments, FIG. 5 shows an example dashboard GUI 500 according to some embodiments, and FIG. 6 shows an example platoon preferences GUI 600 according to some embodiments. FIGS. 3-6 show and describe a CASN profile information of an owner/operator of the CA/AD vehicle 152-1 discussed previously, and which may be referred to as the "CASN user," "subject user," or the like. Additionally, the aspects of these examples are applicable to other CASN users and other vehicles.

The GUIs 300-600 shown by FIGS. 3-6, respectively, may be implemented to enable a user to interact with the CASN platform, and rendering GUIs 300-600 in an application container or web browser. An output device (e.g., display device, a display screen or windshield of a head-up display (HUD) system, etc.) of CA/AD vehicle 152-1 may display the rendered GUIs 300-600. Interacting with the CASN platform may allow CASN users to connect various CASN users within the entire CASN, within one or more user defined groups within the CASN, within an individual enterprise (e.g., a corporation, partnership, or other organization), or a group of users within an enterprise. As shown by FIGS. 3-6, GUIs 300-600 include graphical control elements (CGEs) 301 and GCEs 302. The GCEs 301 and 302 are components or other elements that the user may use to manipulate in order to interact with the CASN platform. As shown by FIGS. 3-6, the GCEs 301/302 are shown as icons in respective toolbars or ribbons. In other embodiments, other types of GCEs and other combinations of GCEs may be used, such as buttons, tabs, menu bars, check boxes, drop-down lists, menu boxes, spinners, etc. Although not shown by FIGS. 3-6, the GUIs 300-600 may use various highlighting techniques to indicate a current page or inactive/active graphical elements, for example, by graying out inactive elements and darkening active elements and/or darkening or highlighting a graphical element that corresponds to a currently rendered page. The GCEs 301/302, as well as the other graphical elements shown by FIGS. 3-6, may be developed or defined using a suitable widget/GUI toolkit, UX library, etc., such as Cocoa provided by Apple®, Inc., Windows API provided by Microsoft®, GTK+ provided by the GNOME project, Qt provided by the Qt Group, Google Web Toolkit (GWT) provided by Google®, Inc., and/or the like.

The GCEs 301 allow the user to navigate to different areas of the CASN platform. In the examples of FIGS. 3-6, the GCEs 301 include a Home GCE that allows the user to navigate to a CASN feed GUI 400 (FIGS. 4A and 4B); a My Profile GCE that allows the user to navigate to a profile GUI 300 (FIG. 3); a Groups GCE that allows the user to navigate to a groups page to view various groups to which the user is a member; a Dashboard GCE that allows the user to navigate to a dashboard GUI 500 (FIG. 5) to view various vehicle metrics of the host vehicle; a Messages tab/button that allows the user to navigate to a communication service (e.g., instant messaging, email, etc.) to send and receive messages to/from other CASN users; a Map GCE that allows the user to navigate to a mapping or navigation service to view a current location, obtain navigation information, etc.; a Settings GCE that allows the user to navigate to a navigate to an interface for adjusting or changing various CASN platform configurations (e.g., privacy settings, notification settings, etc.), and a Help GCE that allows the user to navigate to an interface for searching and reading user assistance documentation and/or to contact technical support. Additional or alternative GCEs 301 may also be included in other embodiments.

The GUIs 300-600 also include graphical control elements (CGEs) 302 that allow a user to perform various CASN functions as discussed herein. In the examples of FIGS. 3-6, the GCEs 302 include a Learning GCE that allows the user to share AI Agent 209 learning models and the like (e.g., by sending or broadcasting requests for learning models); a My Platoons GCE that allows the user to establish or join a platoon, and set various platoon preferences and parameters (see e.g., FIG. 7); an Infrastructure GCE that allows the user to perform infrastructure analyses in a surrounding area/region, or of a desired destination (see e.g., FIG. 6); and an Opportunities GCE that allows the user to navigate to marketplace GUI to identify various opportunities for earning incentives for sharing CASN profile information. Additional or alternative GCEs 302 may also be included in other embodiments.

The GUIs 300-600 also include a relationships container 305. The relationships container 305 is a GCE or widget that contains a list of connections 153. The list of connections 153 is a list other CASN users that the subject user shares a connection 153. Each connection 153 in the list of connections 153 denotes a (data) relation between the subject user and another CASN user. The act of establishing a connection 153 with another CASN user (sometimes referred to as "friending") may allow the subject user to access or view information generated by the other CASN user and/or information generated about or associated with the other CASN user. The subject user may access this information by visiting a profile or feed page of the other CASN user, and/or the information may be aggregated or collected by a feed mechanism and published in one or more feed containers that are accessible by the subject user.

In the examples of FIGS. 3-6, the relationships container 305 includes a thumbnail image representing each CASN user in the listed of connections 153 (also referred to as "friends"). Each of the thumbnails is a GCE or link to a profile page of a corresponding CASN user. As alluded to previously, the subject user may construct the list of connections 153 by sending invitations to make a connection (or a "friend request") to other CASN users, and may also delete (or "unfriend") individual users in the list of connections 153.

The GUIs 300-600 also include a feed container 310 (also referred to as a "feed item" or the like). In the example of FIGS. 3-6, the feed container 310 is a embeddable widget (e.g., an RSS feed reader, aggregator, or the like) or other like GUI component that displays a feed of a platoon ("Platoon Group Alpha") to which the CASN user is or was a member. The feed container 310 shows posts by individual members of Platoon Group Alpha, and displays posts made by individual users (also referred to as "feed data") in chronological order. In some embodiments, the subject user may be able to added additional feed containers and remove feed container 310. Feeds and feed containers are discussed in more detail with respect to FIGS. 4A and 4B, and in particular, the feed container 310 may be the same or similar to the feed container 410 discussed infra.

Referring now to FIG. 3 wherein a CASN profile GUI 300 of the subject user in accordance with various embodiments, is illustrated. In embodiments, each user within the CASN is associated with a user profile (or a "CASN profile"). A user profile is a collection of data about a given user in the CASN. In general, the user profile data can include general information, such as a name, phone number, address or geolocation, a photo, a biographical summary, or a status (e.g., text describing what the user is currently doing, thinking or expressing). In embodiments, the profile 300 includes data about a host vehicle and/or an owner/operator of the host vehicle, and may include system information (e.g., compiled by the system monitor 204).

In the example of FIG. 3, the profile 300 includes vehicle information 315 such as make, model, year, registration (license plate) number, registration state, vehicle identification number (VIN), and a fingerprint. The "fingerprint" is a string or data structure that is tied to a relatively large data item or data set. In this example, the fingerprint is a string generated based on a combination of the system information, CSD obtained from the DCUs 120, sensor data obtained from the sensors 110 or other sensors 220, and/or signals or data obtained from other subsystems of the CASN system 200. In these embodiments, the CASN profiler 206 may calculate the fingerprint using a suitable a cryptographic hash function (e.g., MD5, SHA-1, SHA-2, SHA-3, etc.), a rolling hash function (e.g., Rabin fingerprinting algorithm, cyclical polynomial, etc.), or the like The profile 300 also includes vehicle configuration information 320 such as vehicle measurements, engine details, fuel economy, and other information as is shown by FIG. 3. Additional information or less information than shown may be included in the profile 300. The profile 300 also includes CA/AD configuration information 325 such as information about the various control systems implemented by the host vehicle (e.g., Electronic Stability Control (ESC), Electronic Brakeforce Distribution (EBFD), Anti-lock Braking System (ABS), indirect Tire Pressure Monitoring System (iTPMS), Collision Avoidance System (CAS), and Power Management Control (PMC) in FIG. 3); information about the sensors 110 included in or attached to the host vehicle (e.g., Multi-Angle Rearview Camera(s) and LIDAR (front and rear facing) in FIG. 3), information about the various output devices included in or attached to the host vehicle (e.g., LED display screen and 450 W audio system in FIG. 3). Additionally, the CA/AD configuration indicates the communication circuitry and the IVI system 100 ("IVI platform" in FIG. 3) implemented by the CA/AD vehicle 152-1. In this example, the communication circuitry comprises an Intel® 5G modem for cellular V2X communications and a Redpine Signals® WAVECombo™ chipset, which operates according to IEEE 802.11p, 802.11abgn, dual mode Bluetooth 4.1 and 802.15.4/ZigBee. The IVI system 100 in this example is the Intel® GO™ platform, which may be a chipset including the Next-Gen Intel® Atom™ processor (Automotive Safety Integrity Level (ASIL) C), an Arria® 10 accelerator card/module, an Infineon AURIX*(ASIL D) microcontroller, a power management integrated circuit (PMIC) provided by ON Semiconductor (ASIL D), 6×1 gigabit Ethernet switch fabric, two channels DDR3L/DDR4 DRAM, eMMC flash drive, FlexRay and UART bus technology.

Although not shown by FIG. 3, the profile 300 could include other vehicle-related data, such as information about the various DCUs 120 included in the vehicle, a layout of the hardware elements (e.g., the sensors 110, DCUs 120, subsystems of the CASN system 200, etc.), and/or other like information. The layout of hardware elements may indicate a position and orientation of each hardware element in or on the host vehicle, and/or the location of each hardware element with respect to one or more other hardware elements in or on the host vehicle.

The CA/AD configuration information 325 also indicates individual AI agents 209 implemented by the host vehicle. In this example, the individual AI agents 209 are listed with the corresponding control systems that those AI agents 209 control, for example, AI Agent1 controls the ESC control system, AI Agent2 controls the EBFD control system and the ABS control system, AI Agent3 controls the CAS control system, AI Agent4 controls the iTPMS control system, AI Agent5 controls the PMC control system, and AI Agent6 controls an Advanced Driver Assistance System (ADAS). In addition, the CA/AD configuration information 325 also indicates the autonomy levels (or categories) of individual AI agents 209, for example, AI Agent1 has an autonomy level of 1, AI Agent2 has an autonomy level of 4 for the EBFD and an autonomy level of 1 for the ABS, AI Agent3 has an autonomy level of 0 for the iTPMS, AI Agent4 has an autonomy level of 4, AI Agent5 has an autonomy level of 5, and AI Agent6 has an autonomy level of 2. The autonomy levels may be based on the SAE International J3016 standard. In these embodiments, the autonomy levels may include levels 0 through 5, wherein:

level 0 indicates no autonomy (e.g., all tasks are performed by the driver, a vehicle subsystem, or one or more DCUs 120);

level 1 indicates minimal autonomy (e.g., ODD-specific execution by an AI agent 209 of some subtask of an action/task with the expectation that a driver, subsystem, or DCU 120 performs the remaining subtasks of a task);

level 2 indicates partial autonomy (e.g., ODD-specific execution by an AI agent 209 of some subtasks of an action/task with the expectation that a driver, subsystem, or DCU 120 completes OEDR subtasks and supervises the control system or subsystem);

level 3 indicates conditional autonomy (e.g., sustained and ODD-specific performance by an AI agent 209 of the entire task/action with the expectation that the driver, subsystem, or DCU 120 is receptive and responsive to AI agent 209 issued intervention requests and AI agent 209 performance-relevant system failures in other vehicle subsystems);

level 4 indicates maximal (but not total or full) autonomy (e.g., sustained and ODD-specific performance by an AI agent 209 of an entire action/task including fallback mechanisms without any expectation that a driver, subsystem, or DCU 120 will respond to AI agent 209 issued intervention requests); and level 5 indicates full autonomy (e.g., sustained and unconditional (non-ODD-specific) performance by an AI agent 209 of the all actions/tasks including fallback mechanisms without any expectation that a driver, subsystem, or DCU 120 will respond to AI agent 209 issued intervention requests).

Referring now to FIGS. 4A and 4B wherein an example feed GUI 400 of the subject user is illustrated. In this example, the subject user may select the Home GCE 301 load the GUI 400 in the browser or application container implemented by the CA/AD vehicle 152. In response to selecting the Home GCE 301, microblogging posts 411A-411H (collectively referred to as "post 411" or "posts 411") of feed 410 are requested or fetched and rendered/displayed by the browser or application container implemented by the CA/AD vehicle 152.

As shown, the feed GUI 400 includes a feed container 410. Feed container 410 is a GCE, GUI, widget, data element, etc. that displays a feed. A feed is a mechanism that obtains or receives data from one or more data sources, which is then displayed in the feed container 410. As examples, the feed mechanism may be an RSS (Rich Site Summary or Really Simple Syndication) feed reader/aggregator that consumes XML, RSS, or Resource Description Framework (RDF) formatted content, an Atom Publishing Protocol (APP) feed reader/aggregator that consumes XML or Atom Syndication Format (ASF) formatted content, or the like. In other implementations, the feed mechanism may be publish-subscribe (pub/sub) service, such as WebSub, Cloud Pub/Sub provided by Google®, Amazon® Simple Notification Service (SNS), etc., where the data sources are publishers and the feed container 310/410 is a subscriber of topic-based messages and/or content-based messages. A feed (and feed containers 310 and 410) can present or otherwise include publications, such as user-generated textual posts 411 or comments 415A and 415B (collectively referred to as "comments 415" or "comment 415"), files (e.g., documents, audio data, image data, video data, learning models, etc.), and monitored resource content associated with a user, a group, or a non-human data source (e.g., a database or portions thereof). In FIGS. 3-6, the one or more data sources of the feed container 310 include other CASN users that post content to the Platoon Group Alpha feed page. In FIGS. 4A and 4B, the one or more data sources of the feed container 410 is associated with the subject user and includes posts 411 from other CASN users that have a connection 153 with the subject user (see e.g., FIG. 1).

A "group" generally refers to a collection of users. A group can be defined as users with the same or a similar attributes, by membership or subscription, shared experience, or the like. In embodiments, a group may include a collection of users that travel in a platoon or previously traveled as a platoon at some time in the past. Groups can be set to have different visibilities or settings, for example, some groups can be private (e.g., group content is only viewable by members of the group), some groups can be public (e.g., group content is viewable by any member of the CASN), and some groups can be semi-public (e.g., group content is viewable by members of the group and additional white-listed users). To become a member within a private group (e.g., to have the capability to publish and view feed containers in the group feed) or within a semi-public group (e.g., to have the capability to view feed containers in the group feed), a user must submit a subscription request to the group and be accepted by an administrator or owner of the group. The user could also be invited to subscribe to the group, or be directly subscribed to the group by the administrator or owner of the group. By contrast, any user within the CASN may subscribe to, or follow, a public group within the CASN. The act of subscribing or following a public group may cause the user to become a member of the public group.

As shown, feed containers 310 and 410 are organized in chronological order the associated feed is displayed in a GUI. The feed containers 310 and 410 may be organized in some other suitable or desirable order (which can be customizable by the subject user) in other embodiments. Additionally, the feed containers 310 and 410 can have capabilities such as bookmarks, canvases, content, comments, links, polls, etc. In embodiments, the subject user may access other feed pages of other users or groups, which include feeds displayed in feed containers in a same or similar manner as feed containers 310/410.

Individual posts 411 in the feed containers 310/410 may include character-based user inputs (e.g., words, phrases, statements, questions, emotional expressions ("emoji's"), or symbols) and/or user generated media content (e.g., images, audio, or video content). User feedback may be submitted by individual users in response to a particular post by selecting the GCE 413 (e.g., "heart this" in FIGS. 4A and 4B). Additionally, users can submit comments 415 to a particular post by selecting the GCE 412. For the sake of clarity, some comments GCEs 412 and feedback GCEs 413 are not labeled in FIGS. 4A and 4B. Comments 415 are organized as a list tied to a particular post 411, which branches off from the particular post 411. This is shown by the comments 415A and 415B being tied to, and branching from, post 411E in FIGS. 4A and 4B. Additionally, each comment 415 includes a comment GCE 412 (not labeled in FIGS. 4A and 4B) and a feedback GCE 413 (not labeled in FIGS. 4A and 4B) that allows users to provide additional comments and feedback to corresponding comments 415.

Individual posts 411 can also include monitored resource content, which may include character and/or media content. A post 411 including monitored resource content (also referred to as a "monitored resource update," a "monitored resource post," or the like) is a publication that is automatically generated and published in a feed container 310/410 to indicate the occurrence of an event. The resource to be monitored may be a web resource, a remotely accessible compute or mechanical resource, sensor data output by a sensor 120, a database or a specified entry in a database, one or more defined user actions, one or more defined CA/AD vehicle actions, and/or the like. In the example of FIGS. 4A and 4B, monitored resource post 411A indicates that CA/AD vehicle 152-3 shared an AI learning model with CA/AD vehicle 152-4, and monitored resource post 411B indicates that CA/AD vehicle 152-4 shared an AI learning model with CA/AD vehicle 152-3. The monitored resources of monitored resource posts 411A and 411B may be the act of sharing an AI learning model, which is triggered when respective sharing event occurs.

The resource to be monitored may be referred to as a "managed object", and a "management object" may be defined to monitor the managed object for any changes/updates and generate the data for the monitored resource post to indicate the changes/updates. In embodiments where the Core Data framework (provided by Apple®) is used, the managed object may be an NSManagedObject and the management object may be an NSPersistentStoreCoordinator or a ToDoStoragemanager. In embodiments where the Java® Management Extensions (JME) framework is used, the managed object may be a managed bean (MBean) and the management object may be an Event Listener or Notification Listener. Other frameworks may be used in other embodiments, such as the management information base (MIB) of the Simple Network Management Protocol (SNMP).

In some embodiments, when posts 411 or comments 415 from one or more CASN users are submitted to and posted in a feed, the CASN platform may send a notification to relevant users. The notification may indicate the user that published the post 411 and the post data. The notification may be an email, instant message, SMS/MMS message, or some other type of communication. In a first example, a notification may be transmitted to the subject user when a post 411 is published to a feed belonging to the subject user (e.g., feed 410). In a second example, a notification may be transmitted to all users following or subscribed to a group when a post 411 is published to the feed of that group. In a third example, a notification may be transmitted to a user that published an original post 411 and all users that published comments 415 to the original post 411 after publication of another comment 415 to the original post 411.

Still referring to FIGS. 4A and 4B, the GUI 400 includes a GCE 405 to enable the subject user to compose microblogging posts. The GCE 405 may be a text box, or may be an authoring component that enables the subject user to input data (e.g., text, images, video, etc.) to be posted to the feed 410.

FIG. 4A shows the authoring component 405 in a minimized or inactive state. In some embodiments, the authoring component 405 may be launched by clicking a dedicated button (not shown) in the profile GUI 300. In other embodiments, the authoring component 405 can be invoked or activated, for example, by performing a finger tap gesture in or around the authoring component 405, clicking inside the new post field 404, or by entering text into the new post field 404. When the subject user activates the authoring component 405, the authoring component 405 or the new post field 404 may expand as shown by FIG. 4B. In some embodiments, the authoring component 405 or the new post field 404 may expand as the new post field 404 is populated with content (e.g., input by the subject user, auto-populated content from linked data, or the like).

In some embodiments, the authoring component 405 may include an auto-correct (or auto-complete) application (or call a separate auto-correct/complete application) that generates a list of words or phrases as the subject user enters text into authoring component 405. As shown by FIGS. 4A and 4B, the authoring component 405 includes a GCE 406 that allows the subject user to send composed posts to the CASN platform for publication. When expanded or activated, the authoring component 405 may include a cancel post GCE 416 that, when selected, may delete the data in the authoring tool and/or deactivate or minimize the authoring component 405. When the cancel post GCE 416 is selected, the authoring component 405 may return to the inactive state shown by FIG. 4A.

During composition of a post 411 using the authoring component 405, the subject user may begin typing a mention character followed by the first few letters of a desired CASN user or group name, and the auto-complete application may be used to prompt the user to select from an auto-populated list of user and/or group identifiers that correspond to the already-entered characters. In the example of FIG. 4B, the mention indicator may be the "@" character entered by the subject user, which may be followed by the characters "C", "A", and "/", and the auto-complete application may prompt the user to select the user identifiers for "CA/AD 152-3," "CA/AD 152-2," "CA/AD 152-4," and "CA/AD 152-6," based on the already-entered characters. The auto-populated list may include recently entered user or group identifiers, user identifiers from a contacts list, group identifiers from a group list, etc., that match the characters already entered. The auto-complete application may repeatedly submit requests to retrieve lists of user/group identifiers from the CASN microblogging platform as each character is input by the subject user. In some embodiments, the auto-complete application may use an optimization process where the auto-complete application queries the CASN microblogging platform after a predefined idle or delay in typing.

Various files can be included in, linked to, or attached to a post 411 or comment 415. For example, a post 411 can include textual statements in combination with an attached document. In another example, text and/or content from a linked web page may be auto-populated into the authoring component 405 after the web address is entered into the text box of the component 405. The authoring component 405 includes a GCE 407 that, when selected, executes an upload component or plug-in to enable the subject user to upload one or more files from a local storage or from a remote (cloud) storage system. The upload component may be built using Flash controls, Silverlight controls, Java Applets, HTML5 controls, or some other language or development tools. The authoring component 405 also includes a GCE 408 that, when selected, executes a suitable component or plug-in that enables the subject user to add a link to a web resource or remotely stored file, for example, by selecting a desired resource address (e.g., Uniform Resource Locator (URL), uniform resource identifier (URI), Compact URI (CURIE), internationalized resource identifier (IRI), IP address, etc.). The link component or plug-in may be the same or similar to the upload component.

Referring now to FIG. 5 wherein a dashboard GUI 500 of the subject user in accordance with various embodiments, is illustrated. The dashboard GUI 500 is a platform or application that generates and renders visual presentations of performance measurements, key performance indicators (KPIs), or the like, as well as controls for managing the collection and distribution of the subject user's data.

As shown, the dashboard GUI 500 includes a plurality of widgets 505, which are software components that perform different functions based on user interactions, such as generating and displaying visual presentations of (filtered) data, performance measurements, KPIs, etc. The widgets 505 may be developed using any of the programming languages and/or development tools mentioned herein. Each widget 505 may be associated with a widget configuration or definition that includes information pertaining to how data is to be displayed in a widget 505. This information may include the type of data to display; the data sources to be queried including filter conditions, groupings, and other like parameters; and the particular visual presentation to be used to display the data in the widget 505. The widget configuration may also indicate or define one or more actions or calculations to be performed on both the data represented by the visual presentations and the visual presentations themselves in response to user interactions (e.g., selection of a type of graph to be displayed based on query results, changing a type of graph in response to a trigger or user input, etc.). The visual presentation of data (or "view") to be shown by a widget 505 may include graphs or charts, such as a line graph, bar chart, bar graph, donut chart, pie chart, timeline, geographic map, heat map, tabular charts (e.g., comparison tables, pivot tables, etc.), and/or other like views of data. Although not shown by FIG. 5, the widgets 505 and/or the dashboard GUI 500 may include one or more GCEs (e.g., buttons, check boxes, scroll bars, slides, etc.) that may be used to alter or adjust the data view and/or the parameters of a widget configuration.

The data, performance measures, KPIs, etc. to be displayed by individual widgets 505 may be associated with content generated and shared by the subject user and/or content generated and published in a group administered by the subject user. The type of data, performance measures, KPIs, etc. to be displayed by the widgets 505 may be related to any of the aforementioned use cases (see e.g., the discussion of FIG. 1), such as the type of CASN profile information shared with other users, dynamic incentives earned and/or spent, infrastructure review-related data, platoon-related data, and the like. Other types of data, performance measures, KPIs, etc. to be displayed by individual widgets 505 may include known social media and internet marketing KPIs, such as engagement or impressions; engagement/impression rate; page consumption; reach; amount and type of feedback including negative feedback; number and types of posts 411; conversion rate; amount of referral traffic; number of subscribers; content retention rate; Click-through rate (CTR); cost per click (CPC); cost-per impression (CPI); cost per action (CPA); advertisement view frequency; and the like.

Referring now to FIG. 6 wherein a platoon preferences GUI 600 of the subject user in accordance with various embodiments, is illustrated. The platoon preferences GUI 600 is a platform or application that enables the subject user to set various preferences for traveling in a platoon and also enables the subject user to form platoons with nearby vehicles 230. As shown, the platoon preferences GUI 600 includes a plurality of GCEs 605 (including GCEs 605A, 605B, and 605C). The plurality of GCEs 605 enable the subject user to set various platoon-related parameters. In this example, the GCE 605A is a graphical dial that allows the subject user to set a desired speed at which to travel while in a platoon, the GCE 605B is a slider that allows the subject user to set a desired vehicle gap length (i.e., distance between vehicles) while traveling in a platoon, and GCE 605C includes multiple text boxes that allows the subject user to input text for corresponding platoon preferences 1-N (where N is a number). The platoon preferences GUI 600 also includes and a plurality of GCEs 610 (including GCE 610A and GCE 610B), which enable the subject user to form a platoon. In this example, the GCE 610A is a button that, when selected by the subject user, instructs the main system controller 202 with the assistance of the inter-vehicle communication subsystem 212 to search for existing platoons for the CA/AD vehicle 152-1 to join; and the GCE 610B is a button that, when selected by the subject user, instructs the main system controller 202 with the assistance of the inter-vehicle communication subsystem 212 and/or remote communication subsystem 214 to invite nearby vehicles 230 to establish a platoon with the CA/AD vehicle 152-1.

Figure 7:
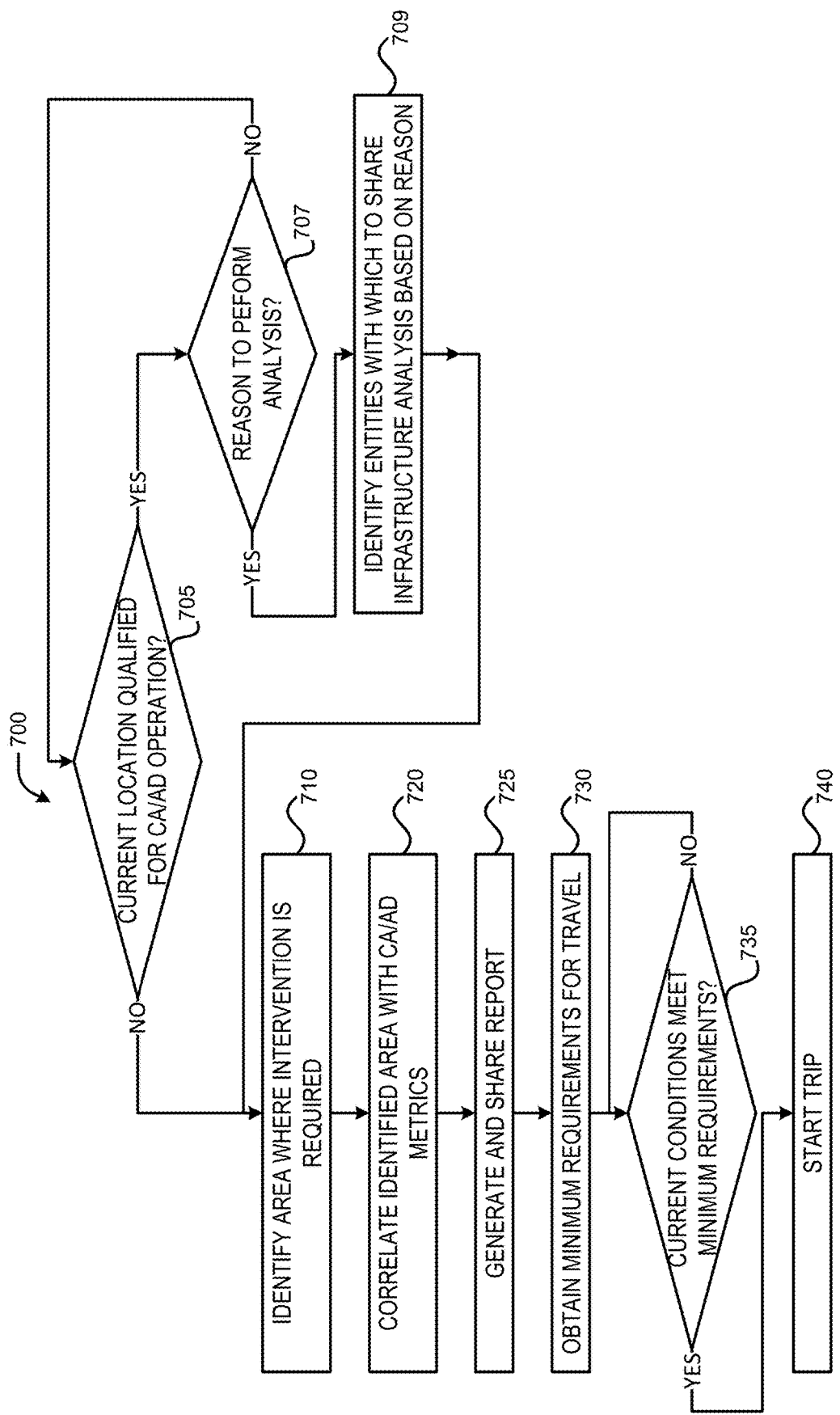
FIG. 7 illustrates an example infrastructure knowledge gathering and sharing process, according to various embodiments.

Referring now to FIG. 7, wherein an example infrastructure knowledge gathering and sharing process 700, according to various embodiments, is illustrated. Process 700 may be used to share infrastructure knowledge, which could include sharing knowledge of geographic regions where infrastructure is lacking, sharing knowledge of situations where infrastructure is overloaded or non-accessible (e.g., during a power outage), and/or sharing reviews of CA/AD vehicle-related infrastructure, such as information as to the infrastructure at rest areas, fueling/charging stations, along certain roads, or in certain localities/municipalities. The various operations of process 700 may be performed by the various controllers and subsystems 202-210 of CASN system 200 of FIG. 2. In alternate embodiments, there may be additional operations, fewer operations, or some of the operations may be performed in different order.

Process 700 may start at operation 705, where the main system controller 202 determines whether the CA/AD vehicle 152 is presently located at a location qualified for operation of a CA/AD vehicle 152 (or an AV). Qualification for operation of CA/AD vehicles 152 (or an AV) is based on the amount and type of infrastructure at a given location. In other words, a region or area may not be qualified for CA/AD vehicle operation if a sufficient number or type of infrastructure is not deployed in the region/area. The infrastructure may include network elements (e.g., WAN 156 of FIG. 1), fueling/charging stations, smart traffic control devices, and/or the like. Traffic control devices (TCDs) may include signal devices (e.g., traffic lights), markers, signs, etc., and smart TCDs are TCDs that are capable of communicating with CA/AD vehicles 152, remote servers 240, etc. for the purpose of controlling and managing vehicular traffic.

In some embodiments, the main system controller 202 may determine whether the location is qualified for CA/AD vehicle 152 operation based on information received from remote servers 240, such as a list of underserved regions/areas or a list of served/supported regions/areas. In these embodiments, the main system controller 202 would compare a current location (e.g., GNSS coordinates, LTE location services coordinates, or the like) with the information in the list, for example, by determining if the current location is in a list of underserved regions/areas or not in the list of served/supported regions/areas. In some embodiments, the main system controller 202 may determine whether the location is qualified for CA/AD vehicle 152 operation based on a measurement drive test (MDT) configuration, and the main system controller 202 or the communication system of the CA/AD vehicle 152 may perform MDT measurements according to the MDT configuration (see e.g., 3GPP technical specification 37.320 v15.0.0 (2018-06)).

If at operation 705 the main system controller 202 determines that the CA/AD vehicle 152 is not presently located at a location qualified for operation of a CA/AD vehicle 152, the main system controller 202 proceeds to operation 710 to identify areas area where an intervention is needed or required, which is discussed in more detail infra. If at operation 705 the main system controller 202 determines that the CA/AD vehicle 152 is presently located at a location qualified for operation of a CA/AD vehicle 152, then the main system controller 202 proceeds to operation 707 to determine if there is a reason to perform an infrastructure analysis. Operation 705 may be performed periodically, at a predetermined interval, or in response to some detected trigger or event. A an example, the trigger or event may be a radio link failure, signal strength falling below a threshold, current or predicted inclement weather.

At operation 707 the main system controller 202 determines whether the is a reason to perform an infrastructure analysis. As examples, the main system controller 202 may determine a reason to perform the analysis at operation 707 based on a user input (e.g., selection of the infrastructure GCE 302 of FIGS. 3-6), a command/instruction received from a remote server 240 (e.g., MDT configuration), based on some external event (e.g., inclement weather), or based on a trigger (e.g., detecting road damage based on processed sensor data). If at operation 707 the main system controller 202 determines that there is not a reason to perform an infrastructure analysis, then the main system controller 202 proceeds back to perform operation 705.

If at operation 707 the main system controller 202 determines that there is a reason to perform an infrastructure analysis, then the main system controller 202 proceeds to operation 709 to identify one or more entities with which to share the infrastructure analysis based on the determined reason. As examples, the entities may include a cloud analytics service (e.g., servers 160 of FIG. 1), a mobile network operator (MNO), a government regulatory or law enforcement agency, one or more other CA/AD vehicles 152.

At operation 710, the main system controller 202 identifies an area where an intervention is needed or required ("potential infrastructure deployment areas"). In some embodiments, the main system controller 202 may identify potential infrastructure deployment areas by controlling or instructing the communication system (e.g., inter-vehicle communication subsystem 212 and/or remote communication subsystem 214) to broadcast beacon signals or advertisement messages, and attempt to receive response signals/messages, or to perform energy detection, channel sensing, and/or signal measurements operations. In some embodiments, the main system controller 202 may identify potential infrastructure deployment areas by controlling or instructing one or more sensors 110 (e.g., image capture devices) to capture sensor data (e.g., images or video) of a surrounding area, and identifying the potential infrastructure deployment areas based on the sensor data.

At operation 720, the main system controller 202 correlates the identified area(s) with CA/AD vehicle 152 metrics, such as those discussed previously with regard to FIGS. 1-3. In one example, the main system controller 202 correlates the identified area(s) with the current geolocation coordinates of the CA/AD vehicle 152. In this example, the identified area(s) may also be correlated with any obtained signal strength measurements and/or sensor data.

At operation 725, the main system controller 202 generates an infrastructure analysis report and shares the report with the appropriate entities. In embodiments, the main system controller 202 generates the report to include the data correlated at operation 720, and the reason for performing the infrastructure analysis. The reason included in the report may be an indication that the CA/AD vehicle 152 is located at a non-qualifying area, or may be an indication of the reason identified at operation 709.

As alluded to previously, sharing the infrastructure analysis report may be based on the reason for performing the infrastructure analysis. In one example, the infrastructure analysis report may be shared with a cloud analytics service when the reason is a trip related reason, such as inclement weather, lack of charging/fueling stations, vehicular traffic congestion, or the like.

In another example, the infrastructure analysis report may be shared with a governmental agency, such as a city planning commission or a department of transportation, when the reason is based on lacking or faulty communication infrastructure, or damaged vehicular infrastructure (e.g., roads, bridges, traffic control devices, etc.). In this example, the infrastructure analysis report could be shared with a cloud analytics service that is a private contractor of the governmental agency rather than directly sharing the report with governmental agency.

In another example, the infrastructure analysis report may be shared with an MNO when the reason is based on lacking or faulty communication infrastructure or for network optimization purposes. In this example, the infrastructure analysis report may include performance measurements, MDT results, or the like, which is shared with one or more WANs 156, The WANs 156 may be passed to a network manager (NM) element that automatically triggers various self-organizing network (SON) functions at the WANs 156, such as load balancing optimization, handover parameter optimization, interference control, coverage and capacity optimization (CCO), random access channel (RACH) optimization, energy savings management (ESM), and/or the like.

In another example, the infrastructure analysis report may be shared with the CASN platform and/or one or more other CA/AD vehicles 152 when the reason for performing the analysis is based on a user input or command. In this example, the infrastructure analysis report can include textual, audio, or video reviews by users of the CA/AD vehicles 152, which may be published as a post 411. In some embodiments, the reviews can be numerical ratings determined by the amount of human intervention required to complete a trip or a journey (e.g., where a highest rating may be a trip/journey that requires no human intervention from start to finish, and a lowest rating may be a trip/journey that requires human intervention from start to finish.

At operation 730, the main system controller 202 obtains or identifies minimum travel requirements. These requirements may be indicative of environmental conditions (e.g., damaged vehicular infrastructure) or communications conditions (e.g., faulty or unavailable communication infrastructure) that are needed to safely travel to a desired destination. In some embodiments, the main system controller 202, with the assistance of the vehicle communication system, may obtain the minimum travel requirements from the cloud analytics service and/or a navigation/mapping service. At operation 735, the main system controller 202 determines whether current conditions meet the minimum travel requirements. If at operation 735 the main system controller 202 determines that the current conditions do not meet the minimum travel requirements, then the main system controller may loop back to perform operation 735. This may represent waiting for inclement weather to subside, or allowing the owner/operator of the CA/AD vehicle 152 to perform driving-related tasks that would normally be performed by an AI agent 209 or some other automated means.

If at operation 735 the main system controller 202 determines that the current conditions do meet the minimum travel requirements, then the main system controller 202 may proceed to operation 740 to begin a trip to the desired destination.

Figure 8:
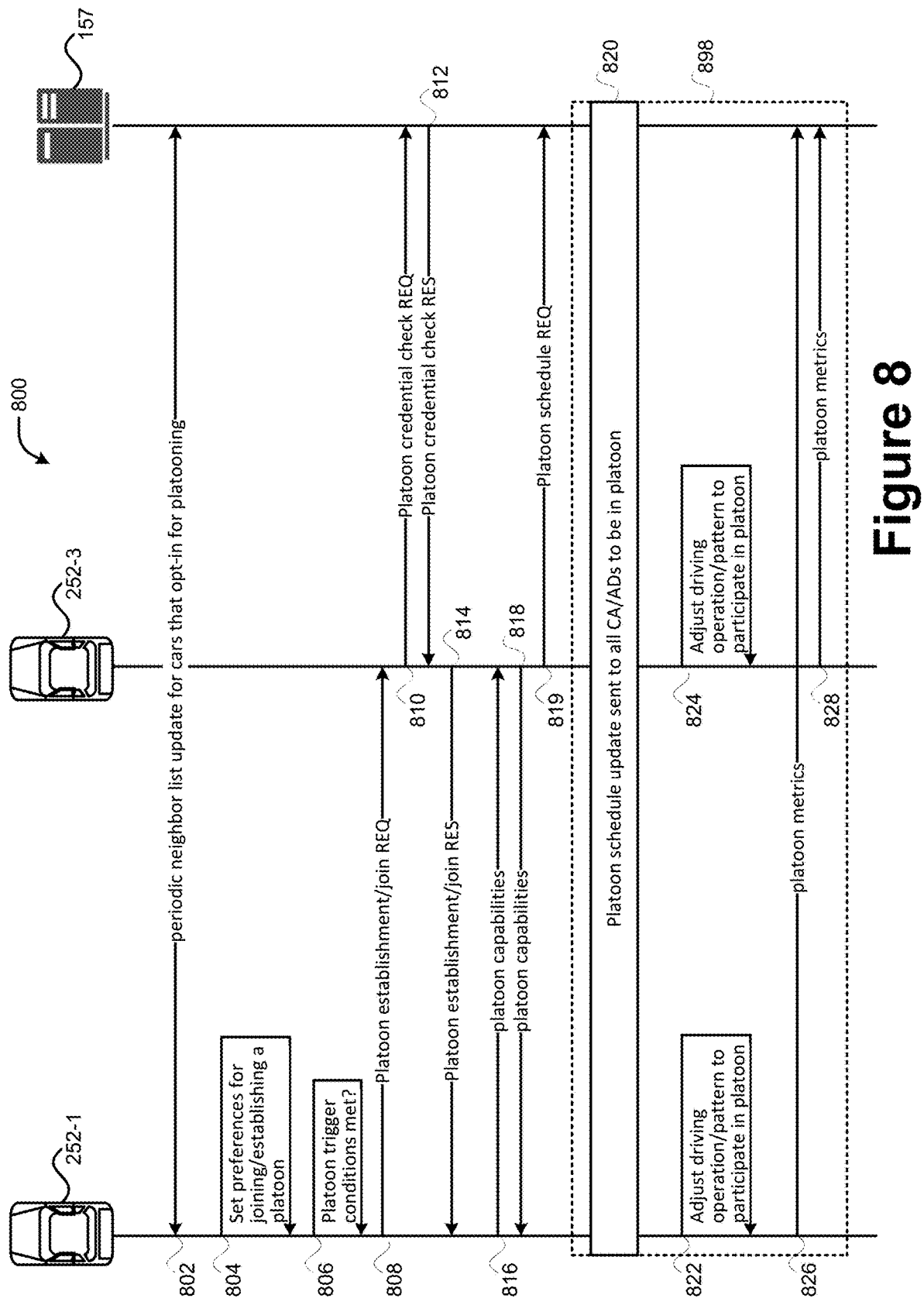
FIG. 8 illustrates an example vehicular platoon formation process, according to various embodiments.

Referring now to FIG. 8, wherein an example process 800 for providing dynamic platooning opportunities, according to various embodiments, is shown. Process 800 maybe used by a CA/AD vehicles 152 to invite other proximate CA/AD vehicles 152 to join an existing platoon or to establish a new platoon. An automotive platoon comprises two or more vehicles travelling as a group, wherein one vehicle acts as a leader of the platoon and other vehicles in the platoon are controlled fully or semi-autonomously. In the example of FIG. 7, the CA/AD vehicle 152-3 of FIG. 1 acts as a platoon leader and the CA/AD vehicle 152-1 acts as a prospective member of the platoon. The various operations of process 800 may be performed by the various controllers and subsystems 202-210 of CASN system 200 of FIG. 2, which may be implemented in each of CA/AD vehicles 152-1 and 152-3. In alternate embodiments, there may be additional operations, fewer operations, or some of the operations may be performed in different order.

Process 800 may start at operation 802 where the CA/AD vehicle 152-1 periodically obtains neighbor list updates from the MEC host 157. The neighbor list may indicate one or more CA/AD vehicles 152 that have opted-in to being notified about platooning opportunities. The identities included in the neighbor list may be based on the particular communication technology used. For example, the neighbor list can indicate CASN user names, IP addresses of the CA/AD vehicles 152, IPv4 link-local address, IPv6 link-local address, International Mobile Subscriber Identities (IMSIs), International Mobile Equipment Identity (IMEI), International mobile group identity (IMGI), Temporary Mobile Subscriber Identity (TMSI), Physical Cell Identifier (PCI), ProSe UE identifier (ID), ProSe Application ID, Service Set Identifier (SSID) and/or basic service set identifier (BSSID) (e.g., names of one or more proximate platoons), MAC address, or some other suitable identifier of proximate CA/AD vehicles 152.

At operation 804, the CA/AD vehicle 152-1 sets various preferences for joining or establishing a platoon ("platoon preferences").

The platoon preferences may include conditions for triggering generation and transmission of a platoon join/establishment request, longitudinal preferences (e.g., travel speed, gap length between platoon members), and lateral preferences (e.g., land width and steering preferences). The platoon triggering conditions may include defining a number of proximate CA/AD vehicles 152 that are desired to be in the platoon and/or a maximum distance that these CA/AD vehicles 152 have to be from the CA/AD vehicle 152-1. At operation 806, the CA/AD vehicle 152-1 determines whether the platoon trigger conditions have been met. If the platoon trigger conditions have been met, at operation 808 the CA/AD vehicle 152-1 generates and transmits a platoon establishment/join request (REQ) to the CA/AD vehicle 152-3. At operation 810, the CA/AD vehicle 152-3 sends a platoon credential REQ to the MEC host 157, and at operation 812, the CA/AD vehicle 152-3 receives a platoon credential RES from the MEC host 157. The platoon credential RES may indicate whether the CA/AD vehicle 152-1 is permitted to join or establish a platoon, which may be based on subscription information, a CASN ranking or rating in CA/AD vehicle 152-1, or the like. The platoon credential RES may include a digital certificate of the CA/AD vehicle 152-1 or other information needed to be exchanged among the vehicles in the platoon.

If the CA/AD vehicle 152-1 is permitted to join or establish a platoon, then at operation 814 the CA/AD vehicle 152-3 sends a platoon establishment/join RES to the CA/AD vehicle 152-1. At operations 816 and 818, the CA/AD vehicles 152-1 and 152-3 exchange their respective platoon capabilities and preferences in respective platoon capabilities message. Typically, platoon capabilities messages may indicate communication capabilities of a CA/AD vehicle (e.g., communication circuitry and supported communication protocols). In embodiments, the platoon capabilities message may include CASN profile information, such as the CA/AD configuration 325 and vehicle metrics discussed previously. In some embodiments, the capabilities message can also include some or all of the vehicle information 315, vehicle configuration data 320, and other CASN information/data discussed previously.

After the platoon capabilities are exchanged, the CA/AD vehicle 152-3 sends a platoon scheduling REQ to the MEC host 157. In response to the platoon schedule REQ, a platoon formation procedure 898 is performed, wherein the CA/AD vehicles 152 in the establish a platoon or make the necessary adjustments for a new CA/AD vehicle 152 to join an already established platoon.

The platoon formation procedure 898 includes operation 820 where the MEC host 157 broadcasts a platoon schedule update message to all of the CA/AD vehicles 152 in the platoon. The platoon schedule update message may indicate various parameters for vehicle operation while the platoon is formed (e.g., speed, gap length, steering preferences, etc.), the arrangement of the vehicles in the platoon (or position of each vehicle relative to other vehicles in the platoon), requirements for leaving the platoon, time period of the platoon and/or time that the platoon is to disband, and/or other like parameters.

The platoon formation procedure 898 includes operation 822 and 824 where the CA/AD vehicles 152-1 and 152-3 adjust their respective driving patterns/operations to participate in the platoon. The platoon formation procedure 898 also includes operations 826 and 828 where the CA/AD vehicles 152-1 and 152-3 individually collect and provide platoon-related metrics to the MEC host 157. The platoon-related metrics may be the same or similar to the vehicle metrics discussed previously. In embodiments, the MEC host 157 uses the platoon-related metrics to adjust the platoon parameters as needed, at which point the procedure 898 may repeat by broadcasting a platoon schedule update message at operation 820 with new platoon operation parameters.

Figure 10:
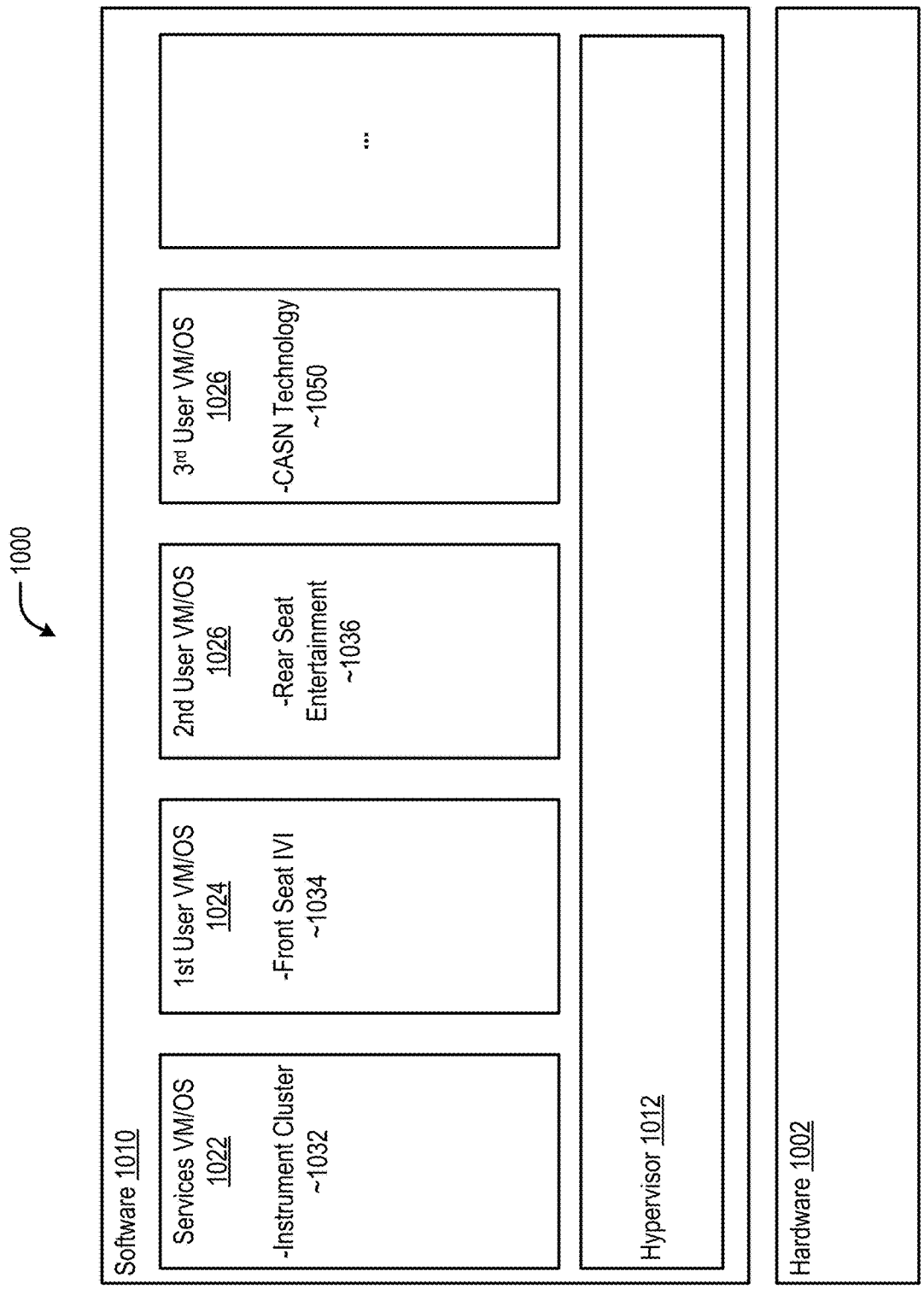
FIG. 10 illustrates a software component view of the vehicle incident management system, according to various embodiments.

Referring now to FIG. 10, wherein a software component view of the CASN system 1000, according to various embodiments, is illustrated. In embodiments, the CASN system 1000 corresponds to the CASN technology 150 of FIG. 1, CASN system 200 of FIG. 2, and/or the virtualization infrastructure of the MEC host 157 of FIG. 1. As shown, for the embodiments, CASN system 1000 includes hardware 1002 and software 1010. Software 1010 includes hypervisor 1012 hosting a number of virtual machines (VMs) 1022-1028. Hypervisor 1012 is configured to host execution of VMs 1022-1028. The VMs 1022-1028 include a service VM 1022 and a number of user VMs 1024-1028. Service VM 1022 includes a service OS hosting execution of a number of instrument cluster applications 1032. User VMs 1024-1028 includes a first user VM 1024 having a first user OS hosting execution of front seat IVI applications 1034, a second user VM 1026 having a second user OS hosting execution of rear seat infotainment applications 1036, a third user VM 1028 having a third user OS hosting execution of CASN technology applications 1050, and so forth.

Except for CASN technology 150 of the present disclosure incorporated, elements 1012-1038 of software 1010 may be any one of a number of known elements. For example, hypervisor 1012 may be any one of a number of hypervisors, such as KVM, an open source hypervisor such as Xen provided by Citrix Inc., of Fort Lauderdale, Fla., VMware provided by VMware Inc. of Palo Alto, Calif., ARM® TrustZone, and so forth. Similarly, service OS of service VM 1022 and user OS of user VMs 1024-1028 may be any one of a number of known operating systems, such as Linux e.g., provided by Red Hat Enterprise of Raleigh, N.C., or Android provided by Google® Inc., Nucleus Real-Time OS (RTOS) provided by Mentor Graphics Corp., QNX® RTOS provided by BlackBerry Ltd., and/or the like.

Figure 11:
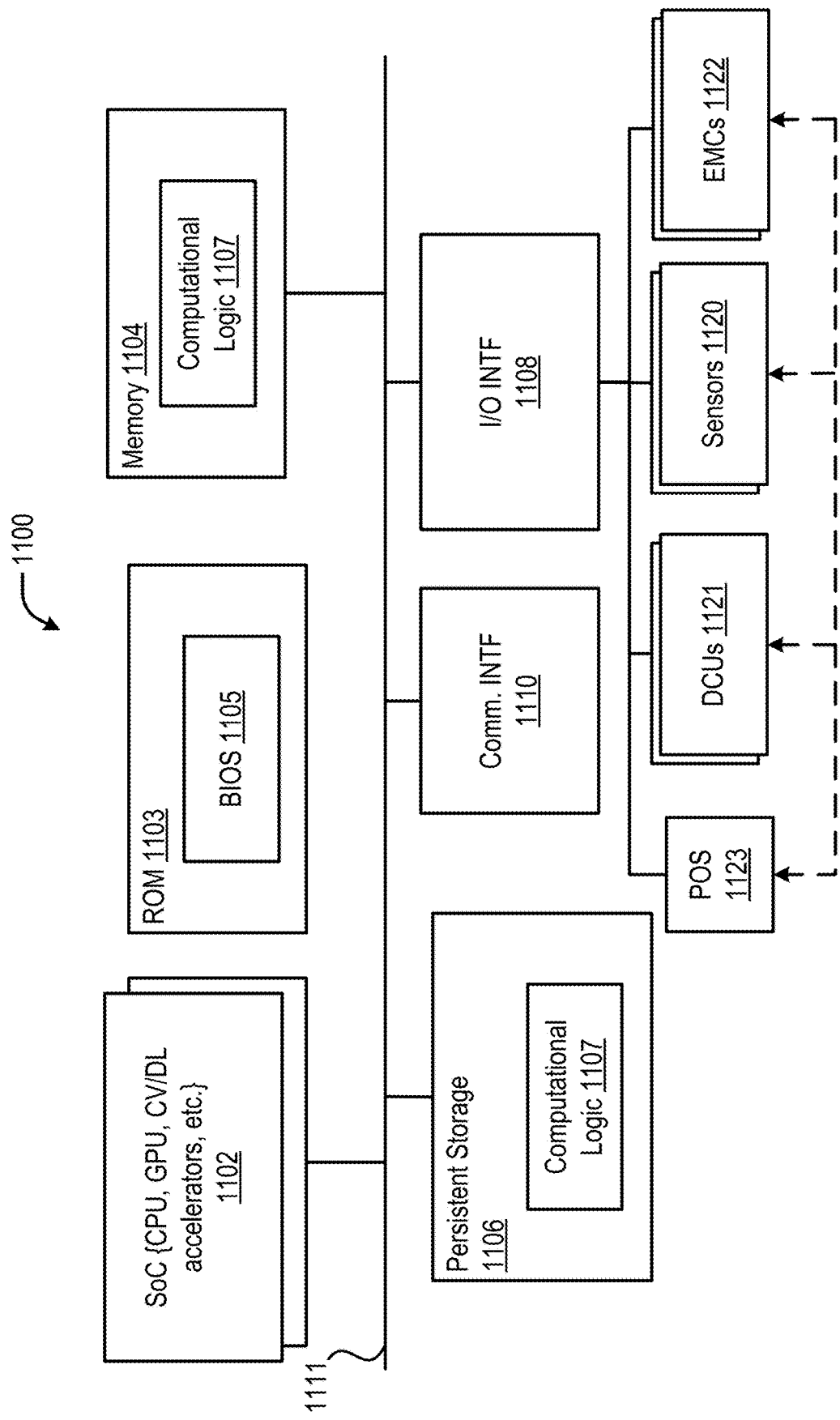
FIG. 11 illustrates a hardware component view of the vehicle incident management system, according to various embodiments.

Referring now to FIG. 11, wherein an example computing platform suitable for use to practice the embodiments of the present disclosure, is illustrated. In embodiments, the computing platform 1100 is the hardware 1002 of FIG. 10. In various embodiments, the platform 1100 maybe used in the CA/AD vehicles 152, WAN 156, MEC host 157, and/or servers 160 of FIG. 1. As shown, computing platform 1100 includes one or more System-on-Chips (SoCs) 1102, ROM 1103, system memory 1104, persistent storage 1106, communication interface 1110, and one or more input/output (I/O) interfaces 1108.

Each SoC 1102 may include processor circuitry, accelerator circuitry, on-chip memory circuitry, and/or other components/circuits. The processor circuitry may include, for example, one or more processor cores (CPUs), one or more application processors, one or more graphics processor units (GPUs), one or more reduced instruction set computing (RISC) processors, one or more Acorn RISC Machine (ARM) processors, one or more complex instruction set computing (CISC) processors, one or more digital signal processors (DSP), one or more field-programmable gate arrays (FPGAs), one or more programmable logic devices (PLDs), one or more application specific integrated circuits (ASICs), one or more baseband processors, one or more radio-frequency integrated circuits (RFIC), one or more microprocessors or controllers, or any suitable combination thereof. In embodiments, individual SoCs 1102 (or the processor circuitry of individual SoCs 1102) may correspond to the CASN system 200 and individual DCUs 120 discussed previously.

The accelerator circuitry may include one or more hardware accelerators. The one or more accelerators may include microprocessors, programmable processing devices (e.g., FPGA, ASIC, etc.), or the like. The accelerator circuitry may include, for example, computer vision (CV) and/or deep learning (DL) accelerators. The on-chip memory circuitry may include any suitable volatile and/or non-volatile memory, such as dynamic random access memory (DRAM), static random-access memory (SRAM), erasable programmable read-only memory (EPROM), electrically erasable programmable read-only memory (EEPROM), Flash memory, solid-state memory, and/or any other type of memory device technology, such as those discussed herein.

ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage known in the art.

The I/O interface(s) 1108 is/are used to connect computing platform 1100 with one or more I/O devices or external devices, such as sensors 1120 (which correspond with sensors 110 of FIGS. 1 and 2), DCUs 1121 (which correspond with the DCUs 120 of FIGS. 1 and 2), EMCs 1122, and positioning circuitry 1123, in the case of CA/AD vehicles 152. Other example I/O devices may include, but are not limited to, display devices, touchscreens, keyboards, buttons, knobs, cursor controllers (e.g., mouse), and so forth.

In embodiments, various combinations of the sensors 1120, DCUs 1121, and EMCs 1122 in a CA/AD vehicle may be part of one or more driving automation systems (DAS). A DAS comprises the hardware and software that are collectively capable of performing part or all of a DDT on a sustained basis, which is capable of level 1-5 automation as defined by SAE International standard J3016. Some of the sensors 1120 may be sensors used for non-DDT systems of the vehicle, such as navigation, autopilot systems, object detection, and/or the like.

Each of the sensors 1120 may include a device, module, or subsystem whose purpose is to detect events or changes in its environment and send the information (sensor data) about the detected events to some other a device, module, subsystem, etc. Examples of such sensors 1120 may include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; outward and inward facing image capture devices (e.g., cameras); light detection and ranging (LiDAR) sensors; proximity sensors (e.g., infrared radiation detector and the like), depth sensors, ambient light sensors, ultrasonic transceivers; and/or microphones.

Some of the sensors 1120 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 1120 may include other sensors such as an accelerator pedal position sensor (APP), accelerometers, magnetometers, level sensors, flow/fluid sensors, barometric pressure sensors, and the like. Sensor data from sensors 110 of the host vehicle may include engine sensor data collected by various engine sensors (e.g., engine temperature, oil pressure, and so forth).

The positioning circuitry 1123 may include circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1123 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1123 may include a Micro-Technology for Positioning, Navigation, and Timing (Micro-PNT) IC that uses a master timing clock to perform position tracking/estimation without GNSS assistance. The positioning circuitry 1123 may also be part of, or interact with, the communication interface 1110 to communicate with the nodes and components of the positioning network.

The I/O interface 1108, in the case of CA/AD vehicle 152, also connects the computing platform 1100 to electro-mechanical components (EMCs) 1122. The EMCs 1122 may be devices that allow platform 1100 or an individual component, mechanical device, etc. to change a state, position, orientation, move, and/or control a mechanism or system. The EMCs 1122 may include one or more power switches, relays including electromechanical relays (EMRs) and/or solid state relays (SSRs), actuators (e.g., valve, actuators, fuel injectors, ignition coils, etc.), audible sound generator(s), a visual warning device(s), motors (e.g., DC motors, stepper motors, etc.), wheels, thrusters, propellers, claws, clamps, hooks, and/or the like.

The I/O interface 1108, in the case of CA/AD vehicle 152, also connects the computing platform 1100 to one or more DCUs 1121 (which correspond to the DCUs 120 of FIGS. 1-2). DCUs 1121 are embedded systems or other like computer devices that control a corresponding system of a vehicle (e.g., vehicles 152 of FIG. 1). The DCUs 1121 may each have the same or similar components as SoC 1102, platform 1100, or may be some other suitable microcontroller or other like processor device, memory device(s), communications interfaces, and the like. Individual DCUs 1121 are capable of communicating with one or more sensors 1120 and EMCs 1122 (represented by dashed lines in FIG. 11). Examples of DCUs 1121 may include, inter alia, a Drivetrain Control Unit, an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), and/or any other entity or node in a vehicle system. Examples of the CSD that may be generated by the DCUs 1121 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

The DCUs 1121 may be provisioned with control system configurations (CSCs), which are collections of software modules, software components, logic blocks, parameters, calibrations, variants, etc. used to control and/or monitor various systems implemented by the CA/AD vehicle 152. The CSCs define how the DCUs 1121 are to interpret sensor data of sensors 1120 and/or CSD of other DCUs 1121 using multidimensional performance maps or lookup tables, and define how actuators/components are to be adjust/modified based on the sensor data. The CSCs and/or the software components to be executed by individual DCUs 1121 may be developed using any suitable object-oriented programming language (e.g., C, C++, Java, etc.), schema language (e.g., XML schema, AUTomotive Open System Architecture (AUTOSAR) XML schema, etc.), scripting language (VB-Script, JavaScript, etc.), or the like. the CSCs and software components may be defined using a hardware description language (HDL), such as register-transfer logic (RTL), very high speed integrated circuit (VHSIC) HDL (VHDL), Verilog, etc. for DCUs 1121 that are implemented as field-programmable devices (FPDs). The CSCs and software components may be generated using a modeling environment or model-based development tools. According to various embodiments, the CSCs may be generated or updated by one or more of the aforementioned AI agents 209 based on learnt experiences, ODDs, and/or other like parameters. In another example, in embodiments where one or more DCUs 1121.

In embodiments, computing platform 1100 is configured to operate one or more EMCs 1122 based on one or more captured events (as indicated by sensor data captured by sensors 1120) and/or instructions or control signals received from user inputs, signals received over-the-air from a service provider, or the like. Additionally, one or more DCUs 1121 may be configured to operate one or more EMCs 1122 by transmitting/sending instructions or control signals to the EMCs 1122 based on detected events (as indicated by sensor data captured by sensors 1120). One or more DCUs 1121 may be capable of reading or otherwise obtaining sensor data from one or more sensors 1120, processing the sensor data to generate control system data (or control system configurations (CSCs)), and providing the control system data to one or more EMCs 1122 to control various systems of the vehicle 152. The SoC 1102 may also access the control system data for processing using a suitable driver, application programming interface (API) or the like, or the DCUs 1121 may be configured to provide the control system data to the SoC 1102 on a periodic or aperiodic basis.

Additionally, computing platform 1100 includes persistent storage devices 1106. Example of persistent storage devices 1106 may include, but are not limited to, flash drives, hard drives, compact disc read-only memory (CD-ROM) and so forth. Further, computing platform 1100 may include input/output devices 1108 (such as display, keyboard, cursor control and so forth) and communication interfaces 1110 (such as network interface cards, modems and so forth). Communication and I/O devices 1108 may include any number of communication and I/O devices known in the art. Examples of communication devices may include, but are not limited to, networking interfaces for Bluetooth®, Near Field Communication (NFC), WiFi, Cellular communication (such as LTE, 4G, or 5G), and so forth. The elements may be coupled to each other via system bus 1111, which may represent one or more buses or interconnect technologies, such as those discussed herein. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with hypervisor 1012, service/user OS of service/user VM 1022-1028, and components of CASN technology 150 (such as main system controller 202, system monitor 204, CASN profiler 206, external environment condition assessment subsystem 208, AI agents 209, and so forth), collectively referred to as computational logic 1107. The various elements may be implemented by assembler instructions supported by processor core(s) of SoCs 1102 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 12:
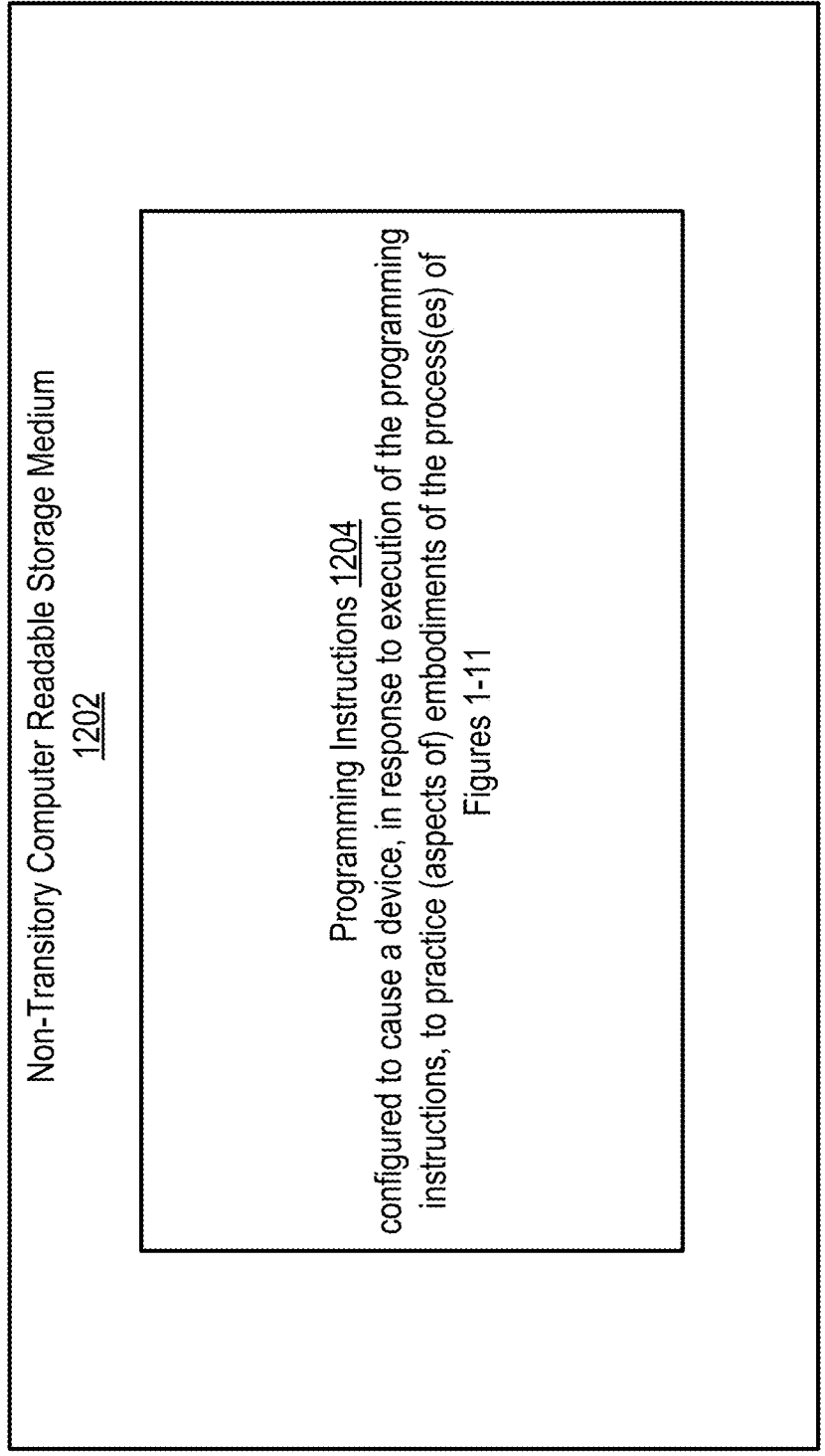
FIG. 12 illustrates a storage medium having instructions for practicing methods described with references to FIGS. 1-9, according to various embodiments.

FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1004. Programming instructions 1204 may be configured to enable a device, e.g., computing platform 1100, in response to execution of the programming instructions, to implement (aspects of) hypervisor 112, service/user OS of service/user VM 122-128, and components of CASN technology 150 (such as main system controller 202, occupant condition assessment subsystems 204, vehicle assessment subsystem 206, external environment condition assessment subsystem 208, and so forth) In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools. The computer program code for carrying out operations of the present disclosure may also be written in any combination of the programming languages discussed herein. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information As used herein, the term "computer system" refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "appliance," "computer appliance," or the like, refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 includes an apparatus implemented in a first computer-assisted or autonomous driving (CA/AD) vehicle, the apparatus comprising: communication circuitry to communicate with a second CA/AD vehicle, both the first and second CA/AD vehicles being members of a CA/AD vehicle social network and having a relationship with each other within the CA/AD vehicle social network; and a controller coupled to the communication circuitry, the controller to share authenticated or proprietary information of the first CA/AD vehicle with the second CA/AD vehicle via the communication circuitry.

Example 2 includes the apparatus of example 1 and/or some other examples herein, wherein the authenticated or proprietary information is part of a CA/AD vehicle social network profile of the first CA/AD vehicle.

Example 3 includes the apparatus of example 2 and/or some other examples herein, further comprising: a profiler to generate the CA/AD vehicle social network profile of the first CA/AD vehicle based at least on one or more hardware elements of the first CA/AD vehicle.

Example 4 includes the apparatus of example 3 and/or some other examples herein, wherein the controller is communicatively coupled with one or more sensors attached to, or embedded in, the first CA/AD vehicle, and the controller is communicatively coupled with one or more driving control units (DCUs) embedded in the first CA/AD vehicle, wherein each of the one or more DCUs are configured to control a corresponding driving system of the first CA/AD vehicle.

Example 5 includes the apparatus of example 4 and/or some other examples herein, wherein: the controller is to obtain one or both of: sensor data from the one or more sensors or control data from the one or more DCUs; and the profiler is to generate the CA/AD vehicle social network profile to indicate one or more determined vehicle metrics of the first CA/AD vehicle, wherein the vehicle metrics are based at least in part on the one or more sensors or the control data from the one or more DCUs.

Example 6 includes the apparatus of example 5 and/or some other examples herein, wherein the profiler is to generate the CA/AD vehicle social network profile to indicate driving capabilities of the first CA/AD vehicle based on the vehicle metrics, the sensor data, and/or the control data.

Example 7 includes the apparatus of example 5 and/or some other examples herein, wherein: the controller is to periodically obtain one or both of: other sensor data from the one or more sensors or other control data from the one or more DCUs; and the profiler is to periodically update the CA/AD vehicle social network profile based on the other sensor data and/or the other control data.

Example 8 includes the apparatus of example 7 and/or some other examples herein, wherein the controller is to: identify infrastructure surrounding the AV based on the other sensor data; and generate an infrastructure indication message to indicate the identified infrastructure, wherein the communication circuitry is to transmit the infrastructure indication message to the second CA/AD vehicle or to a cloud computing service.

Example 9 includes the apparatus of example 7 and/or some other examples herein, wherein: the controller is to generate a platoon invitation message when the second CA/AD vehicle is within a predefined distance from the first CA/AD vehicle based on the other sensor data; and the communication circuitry is to broadcast the platoon invitation message to the second CA/AD vehicle within the predefined distance from the first CA/AD vehicle.

Example 10 includes the apparatus of example 3 and/or some other examples herein, wherein the one or more hardware elements of the first CA/AD vehicle comprise: processor circuitry, memory circuitry, communication circuitry, the one or more sensors, the one or more DCUs, and an interconnect technology that couples the one or more hardware elements to one another.

Example 11 includes the apparatus of example 1 and/or some other examples herein, wherein the communication circuitry comprises short range communication circuitry configured to: transmit the authenticated or proprietary information directly to the second CA/AD vehicle.

Example 12 includes the apparatus of example 1 and/or some other examples herein, wherein the communication circuitry comprises long range communication circuitry configured to: transmit the authenticated or proprietary information to the second CA/AD vehicle via a cloud computing service.

Example 13 includes one or more computer readable media (CRM) comprising instructions, wherein execution of the instructions by one or more processors of a computer-assisted or autonomous driving (CA/AD) vehicle is to cause the CA/AD vehicle to: generate and render a graphical user interface (GUI) of a CA/AD vehicle social network (CASN), wherein the GUI comprises a graphical control element (GCE); and in response to selection of the GCE, share CASN profile information with the one or more other CA/AD vehicles having a connection with the CA/AD vehicle in the CASN.

Example 14 includes the one or more CRM of example 13 and/or some other examples herein, wherein the GUI is a first GUI and the GCE is a first GCE, wherein the first GCE includes a second GCE, and wherein execution of the instructions is to cause the CA/AD vehicle to: generate and render a second GUI in response to selection of the second GCE, wherein the second GUI includes a feed container to contain a feed of one or more posts made by members of the CASN.

Example 15 includes the one or more CRM of example 14 and/or some other examples herein, wherein the CA/AD vehicle is a first CA/AD vehicle, and the first GUI includes a fourth GCE, and wherein execution of the instructions is to cause the CA/AD vehicle to: generate and render a fourth GUI in response to selection of the fourth GCE, wherein the fourth GUI includes an infrastructure analysis GCE to control performance of an infrastructure analysis; control performance of an infrastructure analysis of a surrounding area in response to selection of the infrastructure analysis GCE.

Example 16 includes the one or more CRM of example 13 and/or some other examples herein, wherein the CA/AD vehicle is a first CA/AD vehicle, and the first GUI includes a third GCE, and wherein execution of the instructions is to cause the CA/AD vehicle to: generate and render a third GUI in response to selection of the third GCE, wherein the third GUI includes a platoon GCE to control formation of a vehicular platoon; in response to selection of the platoon GCE, control transmission of a platoon request message to a second CA/AD vehicle proximate to the first CA/AD vehicle, wherein the platoon request message is to include a request to establish a platoon with the second CA/AD vehicle or join an existing platoon that includes the second CA/CD vehicle; and control receipt of a platoon response message from the second CA/AD, wherein the platoon response message is to indicate that the first CA/AD is permitted to establish or join the platoon.

Example 17 includes the one or more CRM of example 16 and/or some other examples herein, wherein execution of the instructions is to cause the CA/AD vehicle to: control transmission of a platoon capabilities message to the second CA/AD in response to receipt of the platoon response message, wherein the platoon capabilities message is to include at least some of the CASN profile information; and control receipt of a platoon schedule update message from a network element, wherein the platoon schedule update message is to indicate one or more platoon operation parameters for participating in the platoon based at least in part on the at least some of the CASN profile information.

Example 18 includes the one or more CRM of example 13 and/or some other examples herein, wherein the CASN profile information comprises authenticated or proprietary information, wherein the authenticated or proprietary information is based on one or more hardware elements of the first CA/AD vehicle or based on learning models of one or more artificial intelligence (AI) agents implemented by the CA/AD vehicle.

Example 19 includes the one or more CRM of example 18 and/or some other examples herein, wherein the learning models indicate how individual AI agents of the one or more AI agents are to control corresponding control systems of the CA/AD vehicle, wherein the corresponding control systems include one or more driving control units (DCUs) embedded in the CA/AD vehicle and/or one or more sensors embedded in or attached to the CA/AD vehicle.

Example 20 includes the one or more CRM of example 18 and/or some other examples herein, wherein execution of the instructions is to cause the CA/AD vehicle to: generate the CASN profile to indicate one or more determined vehicle metrics of the CA/AD vehicle and capabilities or autonomy levels of the one or more AI agents.

Example 21 includes a first computer-assisted or autonomous driving (CA/AD) vehicle, comprising: a communication system configured to communicate with other CA/AD vehicles and remote servers; a plurality of vehicular control systems, wherein individual vehicular control systems of the plurality of vehicular control systems includes one or more driving control units (DCUs) and one or more sensors; and a CA/AD vehicle social network (CASN) system communicatively coupled with the communication system and the plurality of vehicular control systems, the CASN system configured to: generate a CASN profile to include authenticated or proprietary information of the first CA/AD vehicle, and control the communication system to share the CASN profile with a second CA/AD vehicle, wherein both the first and second CA/AD vehicles are members of a CASN associated with the CASN system and have a relationship with each other within the CASN.

Example 22 includes the first CA/AD vehicle of example 21 and/or some other examples herein, wherein the authenticated or proprietary information is based on one or more hardware elements of the first CA/AD vehicle or based on learning models of one or more artificial intelligence (AI) agents implemented by the first CA/AD vehicle.

Example 23 includes the first CA/AD vehicle of example 22 and/or some other examples herein, wherein the CASN system configured to: control the communication system to receive CASN profile information from the second CA/AD vehicle; and operate the one or more AI agents to implement one or more learning models included in the CASN profile information of the second CA/AD vehicle.

Example 24 includes the first CA/AD vehicle of example 22 and/or some other examples herein, wherein the CASN system is configured to generate the CASN profile to indicate autonomy levels of the one or more AI agents.

Example 25 includes the first CA/AD vehicle of example 22 and/or some other examples herein, wherein the one or more hardware elements of the first CA/AD vehicle comprise: processor circuitry, memory circuitry, the communication system, the one or more sensors, the one or more DCUs, and an interconnect technology that couples the one or more hardware elements to one another, and the CASN system is configured to generate the CASN profile to indicate a layout of the one or more hardware elements, wherein the layout of the one or more hardware elements indicates a position of each of the one or more hardware elements with other ones of the one or more hardware elements.

Example 26 includes a method to be performed by a first computer-assisted or autonomous driving (CA/AD) vehicle, the method comprising: communicating or causing to communicate with a second CA/AD vehicle, both the first and second CA/AD vehicles being members of a CA/AD vehicle social network and having a relationship with each other within the CA/AD vehicle social network; and sharing or causing to share authenticated or proprietary information of the first CA/AD vehicle with the second CA/AD vehicle.

Example 27 includes the method of example 26 and/or some other examples herein, wherein the authenticated or proprietary information is part of a CA/AD vehicle social network profile of the first CA/AD vehicle.

Example 28 includes the method of example 27 and/or some other examples herein, further comprising: generating or causing to generate the CA/AD vehicle social network profile of the first CA/AD vehicle based at least on one or more hardware elements of the first CA/AD vehicle.

Example 29 includes the method of example 3 and/or some other examples herein, wherein the first CA/AD vehicle includes one or more sensors attached to, or embedded in, the first CA/AD vehicle, and one or more driving control units (DCUs) embedded in the first CA/AD vehicle, wherein each of the one or more DCUs are configured to control a corresponding driving system of the first CA/AD vehicle.

Example 30 includes the method of example 29 and/or some other examples herein, wherein: obtaining or causing to obtain one or both of: sensor data from the one or more sensors or control data from the one or more DCUs; and generating or causing to generate the CA/AD vehicle social network profile to indicate one or more determined vehicle metrics of the first CA/AD vehicle, wherein the vehicle metrics are based at least in part on the one or more sensors or the control data from the one or more DCUs.

Example 31 includes the method of example 30 and/or some other examples herein, further comprising: generating or causing to generate the CA/AD vehicle social network profile to indicate driving capabilities of the first CA/AD vehicle based on the vehicle metrics, the sensor data, and/or the control data.

Example 32 includes the method of example 5 and/or some other examples herein, wherein: periodically obtaining or causing to periodically obtain one or both of: other sensor data from the one or more sensors or other control data from the one or more DCUs; and periodically updating or causing to periodically update the CA/AD vehicle social network profile based on the other sensor data and/or the other control data.

Example 33 includes the method of example 32 and/or some other examples herein, further comprising: identifying or causing to identify infrastructure surrounding the AV based on the other sensor data; generating or causing to generate an infrastructure indication message to indicate the identified infrastructure; and transmitting or causing to transmit the infrastructure indication message to the second CA/AD vehicle or to a cloud computing service.

Example 34 includes the method of example 32 and/or some other examples herein, wherein: generating or causing to generate a platoon invitation message when the second CA/AD vehicle is within a predefined distance from the first CA/AD vehicle based on the other sensor data; and broadcasting or causing to broadcast the platoon invitation message to the second CA/AD vehicle within the predefined distance from the first CA/AD vehicle.

Example 35 includes the apparatus of example 28 and/or some other examples herein, wherein the one or more hardware elements of the first CA/AD vehicle comprise: processor circuitry, memory circuitry, communication circuitry, the one or more sensors, the one or more DCUs, and an interconnect technology that couples the one or more hardware elements to one another.

Example 36 includes the apparatus of example 35 and/or some other examples herein, wherein the communication circuitry comprises short range communication circuitry and the method comprises: transmitting or causing to transmit the authenticated or proprietary information directly to the second CA/AD vehicle.

Example 37 includes the apparatus of example 35-36 and/or some other examples herein, wherein the communication circuitry comprises long range communication circuitry and the method comprises: transmitting or causing to transmit the authenticated or proprietary information to the second CA/AD vehicle via a cloud computing service.

Example 38 includes a method to be performed by a computer-assisted or autonomous driving (CA/AD) vehicle, the method comprising: generating and rendering or causing to generate and render a graphical user interface (GUI) of a CA/AD vehicle social network (CASN), wherein the GUI comprises a graphical control element (GCE); and in response to selection of the GCE, sharing or causing to share CASN profile information with the one or more other CA/AD vehicles having a connection with the CA/AD vehicle in the CASN.

Example 39 includes the method of example 38 and/or some other examples herein, wherein the GUI is a first GUI and the GCE is a first GCE, wherein the first GCE includes a second GCE, and wherein the method comprises: generating and rendering or causing to generate and render a second GUI in response to selection of the second GCE, wherein the second GUI includes a feed container to contain a feed of one or more posts made by members of the CASN.

Example 40 includes the method of example 39 and/or some other examples herein, wherein the CA/AD vehicle is a first CA/AD vehicle, and the first GUI includes a fourth GCE, and the method comprises: generating and rendering or causing to generate and render a fourth GUI in response to selection of the fourth GCE, wherein the fourth GUI includes an infrastructure analysis GCE to control performance of an infrastructure analysis; and performing or causing to perform an infrastructure analysis of a surrounding area in response to selection of the infrastructure analysis GCE.

Example 41 includes the method of example 38 and/or some other examples herein, wherein the CA/AD vehicle is a first CA/AD vehicle, and the first GUI includes a third GCE, and the method comprises: generating and rendering or causing to generate and render a third GUI in response to selection of the third GCE, wherein the third GUI includes a platoon GCE to control formation of a vehicular platoon; in response to selection of the platoon GCE, transmitting or causing to transmit a platoon request message to a second CA/AD vehicle proximate to the first CA/AD vehicle, wherein the platoon request message is to include a request to establish a platoon with the second CA/AD vehicle or join an existing platoon that includes the second CA/CD vehicle; and receiving or causing to receive a platoon response message from the second CA/AD, wherein the platoon response message is to indicate that the first CA/AD is permitted to establish or join the platoon.

Example 42 includes the method of example 41 and/or some other examples herein, further comprising: transmitting or causing to transmit a platoon capabilities message to the second CA/AD in response to receipt of the platoon response message, wherein the platoon capabilities message is to include at least some of the CASN profile information; and receiving or causing to receive a platoon schedule update message from a network element, wherein the platoon schedule update message is to indicate one or more platoon operation parameters for participating in the platoon based at least in part on the at least some of the CASN profile information.

Example 43 includes the method of example 38 and/or some other examples herein, wherein the CASN profile information comprises authenticated or proprietary information, wherein the authenticated or proprietary information is based on one or more hardware elements of the first CA/AD vehicle or based on learning models of one or more artificial intelligence (AI) agents implemented by the CA/AD vehicle.

Example 44 includes the method of example 43 and/or some other examples herein, wherein the learning models indicate how individual AI agents of the one or more AI agents are to control corresponding control systems of the CA/AD vehicle, wherein the corresponding control systems include one or more driving control units (DCUs) embedded in the CA/AD vehicle and/or one or more sensors embedded in or attached to the CA/AD vehicle.

Example 45 includes the method of example 43 and/or some other examples herein, further comprising: generating or causing to generate the CASN profile to indicate one or more determined vehicle metrics of the CA/AD vehicle and capabilities or autonomy levels of the one or more AI agents.

Example 46 includes a method to be performed by a first computer-assisted or autonomous driving (CA/AD) vehicle, the method comprising: communicating or causing to communicate with other CA/AD vehicles and remote servers; controlling or causing to control a plurality of vehicular control systems, wherein individual vehicular control systems of the plurality of vehicular control systems includes one or more driving control units (DCUs) and one or more sensors; and generating or causing to generate a CA/AD vehicle social network (CASN) profile to include authenticated or proprietary information of the first CA/AD vehicle, and sharing or causing to share the CASN profile with a second CA/AD vehicle, wherein both the first and second CA/AD vehicles are members of a CASN associated with the CASN system and have a relationship with each other within the CASN.

Example 47 includes the method of example 46 and/or some other examples herein, wherein the authenticated or proprietary information is based on one or more hardware elements of the first CA/AD vehicle or based on learning models of one or more artificial intelligence (AI) agents implemented by the first CA/AD vehicle.

Example 48 includes the method of example 47 and/or some other examples herein, further comprising: receiving or causing to receive CASN profile information from the second CA/AD vehicle; and operating or causing to operate the one or more AI agents to implement one or more learning models included in the CASN profile information of the second CA/AD vehicle.

Example 49 includes the method of examples 46-47 and/or some other examples herein, further comprising: generating or causing to generate the CASN profile to indicate autonomy levels of the one or more AI agents.

Example 50 includes the method of examples 46-49 and/or some other examples herein, wherein the one or more hardware elements of the first CA/AD vehicle comprise: processor circuitry, memory circuitry, the communication system, the one or more sensors, the one or more DCUs, and an interconnect technology that couples the one or more hardware elements to one another, and the method comprises: generating or causing to generate the CASN profile to indicate a layout of the one or more hardware elements, wherein the layout of the one or more hardware elements indicates a position of each of the one or more hardware elements with other ones of the one or more hardware elements.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A computing device in an ego vehicle, the computing device comprising:
   communication circuitry to:
      transmit a join request in a first vehicle-to-everything (V2X) message to another vehicle, wherein the join request is for joining a vehicle platoon with the other vehicle,
      receive a join response in a second V2X message from the other vehicle, and
      receive a platoon control message in a third V2X message from the other vehicle after receipt of the join response, wherein the platoon control message includes platoon data for controlling the ego vehicle for platooning; and
   processor circuitry communicatively coupled with the communication circuitry, the processor circuitry to:
      automatically generate the join request to join the vehicle platoon when a set of predefined conditions for joining or forming a platoon have been met, and
      control operation of the ego vehicle to travel in the vehicle platoon after receipt of the join response and based on the platoon data.

2. The computing device of claim 1, wherein the vehicle platoon is an existing platoon including the other vehicle or a new platoon to be formed by the ego vehicle and the other vehicle.

3. The computing device of claim 1, wherein:
   the processor circuitry is further to generate a message indicating that the ego vehicle is a platooning enabled vehicle; and
   the communication circuitry is further to transmit the generated message to the other vehicle.

4. The computing device of claim 1, wherein the processor circuitry is further to:
   generate the join request when the ego vehicle is within a certain distance of the other vehicle.

5. The computing device of claim 1, wherein the processor circuitry is further to:
   discover the other vehicle through a social media or match-making service.

6. The computing device of claim 1, wherein the processor circuitry is further to:
   monitor information received by the communication circuitry to discover the other vehicle or the vehicle platoon including the other vehicle.

7. The computing device of claim 1, wherein the other vehicle is traveling in front of the ego vehicle.

8. The computing device of claim 1, wherein the first V2X message, the second V2X message, and the third V2X message are Direct Short Range Communications (DSRC) messages or Intelligent Transport Systems in a 5 gigahertz (GHz) frequency band (ITS-G5) messages, and wherein the communication circuitry is configured to communicate the first V2X message, the second V2X message, and the third V2X message in a 5.9 GHz frequency band and according to a Institute of Electrical and Electronics Engineers (IEEE) 802.11p protocol.

9. The computing device of claim 1, wherein the platoon data includes data for controlling the first vehicle both laterally and longitudinally for the platooning.

10. One or more non-transitory computer readable media (NTCRM) comprising instructions, wherein execution of the instructions by one or more processors of an ego vehicle computing system is to cause the ego vehicle computing system to:
 automatically generate a join request when a set of predefined conditions for joining or forming a platoon have been met, wherein the join request is for joining a vehicle platoon with at least one other vehicle different than an ego vehicle in which the ego vehicle computing system is disposed;
 generate a first vehicle-to-everything (V2X) message to include the join request;
 cause transmission of the first V2X message to the at least one other vehicle;
 receive a join response in a second V2X message from the at least one other vehicle;
 receive a platoon control message in a third V2X message from the at least one other vehicle after receipt of the join response, wherein the platoon control message includes platoon data for controlling the ego vehicle for platooning; and
 control operation of the ego vehicle to travel in the vehicle platoon after receipt of the join response and based on the platoon data.

11. The one or more NTCRM of claim 10, wherein the vehicle platoon is an existing platoon including the at least one other vehicle or a new platoon to be formed by the ego vehicle and the at least one other vehicle.

12. The one or more NTCRM of claim 10, wherein execution of the instructions is to further cause the ego vehicle computing system to:
 generate a message indicating that the ego vehicle is a platooning enabled vehicle; and
 cause transmission of the generated message to the at least one other vehicle.

13. The one or more NTCRM of claim 10, wherein execution of the instructions is to further cause the ego vehicle computing system to:
 generate the join request when the ego vehicle is within a certain distance of the at least one other vehicle.

14. The one or more NTCRM of claim 10, wherein execution of the instructions is to further cause the ego vehicle computing system to:
 discover the at least one other vehicle through a social media or match-making service.

15. The one or more NTCRM of claim 10, wherein execution of the instructions is to further cause the ego vehicle computing system to:
 monitor received information to discover the at least one other vehicle or the vehicle platoon including the at least one other vehicle.

16. The one or more NTCRM of claim 10, wherein the at least one other vehicle is traveling in front of the ego vehicle.

17. The one or more NTCRM of claim 10, wherein execution of the instructions is to further cause the ego vehicle computing system to:
 cause direct transmission of the V2X message including the join request directly to the at least one other vehicle.

18. An ego vehicle, comprising:
 one or more driving control units (DCUs) communicatively coupled with respective components of the ego vehicle, the one or more DCUs arranged to control the respective components of the ego vehicle;
 a computing device communicatively coupled with the one or more DCUs, the computing device arranged to:
  generate a join request, the join request for joining a vehicle platoon with at least one other vehicle different than the ego vehicle when the ego vehicle is within a certain distance of the other vehicle
  automatically generate a first vehicle-to-everything (V2X) message to include the join request when a set of predefined conditions for joining or forming a platoon have been met, and
  after receipt of a platoon control message included in a third V2X message, send commands to the one or more DCUs, the commands cause the one or more DCUs to control the respective components of the ego vehicle so that the ego vehicle travels in the vehicle platoon according to platoon data included in the platoon control message; and
 communication circuitry communicatively coupled with the computing device, the communication circuitry arranged to:
  transmit the first V2X message including the join request to the at least one other vehicle,
  receive a second V2X message including a join response from the at least one other vehicle, and
  receive, after the join response, the third V2X message including the platoon control message from the at least one other vehicle.

19. The ego vehicle of claim 18, wherein the vehicle platoon is an existing platoon including the other vehicle or a new platoon to be formed by the ego vehicle and the other vehicle.

20. The ego vehicle of claim 18, wherein:
 the computing device is further arranged to generate a message indicating that the ego vehicle is a platooning enabled vehicle; and
 the communication circuitry is further arranged to transmit the generated message to the other vehicle.

21. The ego vehicle of claim 18, wherein the computing device is further arranged to one or both of:
 discover the other vehicle through a social media or match-making service; and
 monitor information received by the communication circuitry to discover the other vehicle or the vehicle platoon including the other vehicle.

22. The ego vehicle of claim 18, wherein the other vehicle is traveling in front of the ego vehicle and the other vehicle is travelling in a same direction as the ego vehicle.

23. The ego vehicle of claim 18, wherein the communication circuitry is further to:
 transmit the first V2X message including the join request directly to the other vehicle.

24. The ego vehicle of claim 18, wherein the first V2X message, the second V2X message, and the third V2X message are Direct Short Range Communications (DSRC) messages or Intelligent Transport Systems in a 5 gigahertz (GHz) frequency band (ITS-G5) messages, and wherein the communication circuitry is configured to communicate the first V2X message, the second V2X message, and the third V2X message in a 5.9 GHz frequency band and according to a Institute of Electrical and Electronics Engineers (IEEE) 802.11p protocol.

25. A computing device in a first vehicle, the computing device comprising:
communication circuitry arranged to:
receive a join request in a first vehicle-to-everything (V2X) message from a second vehicle, the join request for joining or forming a vehicle platoon with the first vehicle,
transmit a join response in a second V2X message to the second vehicle, and
receive a platoon control message in a third V2X message from the second vehicle after receipt of the join response, wherein the platoon control message includes platoon data for controlling the first vehicle for platooning; and
processor circuitry communicatively coupled with the communication circuitry, the processor circuitry arranged to:
automatically generate the join response to form the vehicle platoon with the first vehicle or to permit the first vehicle to join an existing vehicle platoon including the first vehicle when a set of predefined conditions for joining or forming a platoon have been met, and
control operation of the first vehicle to travel in the vehicle platoon with the second vehicle after receipt of the join response and based on the platoon data.

26. The computing device of claim 25, wherein:
the processor circuitry is further arranged to generate a fourth V2X message indicating that the first vehicle is a platooning enabled vehicle; and
the communication circuitry is further arranged to transmit the fourth V2X message to the second vehicle.

27. The computing device of claim 25, wherein the processor circuitry is further arranged to:
generate the join response when the second vehicle is within a certain distance of the first vehicle, when the first and second vehicles are travelling in a same direction, and when the first vehicle is traveling in front of the second vehicle.

28. The computing device of claim 25, wherein the processor circuitry is further arrange to one or both of:
discover the second vehicle through a social media or match-making service; and
monitor information received by the communication circuitry to discover the second vehicle or the vehicle platoon including the second vehicle.

29. The computing device of claim 25, wherein the first V2X message, the second V2X message, and the third V2X message are Direct Short Range Communications (DSRC) messages or Intelligent Transport Systems in a 5 gigahertz (GHz) frequency band (ITS-G5) messages, and wherein the communication circuitry is configured to communicate the first V2X message, the second V2X message, and the third V2X message in a 5.9 GHz frequency band and according to a Institute of Electrical and Electronics Engineers (IEEE) 802.11p protocol.

* * * * *

UNITED STATES PATENT AND TRADEMARK OFFICE
CERTIFICATE OF CORRECTION

PATENT NO. : 11,704,007 B2
APPLICATION NO. : 17/315672
DATED : July 18, 2023
INVENTOR(S) : Fatema Adenwala et al.

It is certified that error appears in the above-identified patent and that said Letters Patent is hereby corrected as shown below:

In the Claims

Column 49
Line 4 "…to a Institute…" should read --… to an Institute …--

Column 50
Line 53 "…is travelling in a same direction…" should read --… is traveling in a same direction …--
Line 66 "…to a Institute…" should read --… to an Institute …--

Column 52
Line 7 "…are travelling in a same" should read --…are traveling in a same--
Line 11 "processor circuitry is further arrange…" should read --processor circuitry is further arranged…--
Line 26 "…to a Institute…" should read --… to an Institute …--

Signed and Sealed this
Twentieth Day of August, 2024

Katherine Kelly Vidal
*Director of the United States Patent and Trademark Office*